United States Patent
Mu

(10) Patent No.: US 12,150,125 B2
(45) Date of Patent: Nov. 19, 2024

(54) TRANSMISSION BLOCK PROCESSING METHOD AND APPARATUS, ELECTRONIC DEVICE AND COMPUTER-READABLE STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 760 days.

(21) Appl. No.: 17/161,179

(22) Filed: Jan. 28, 2021

(65) Prior Publication Data
US 2021/0153229 A1 May 20, 2021

Related U.S. Application Data

(63) Continuation of application No. PCT/CN2018/097811, filed on Jul. 31, 2018.

(51) Int. Cl.
| | |
|---|---|
| *H04W 72/21* | (2023.01) |
| *H04W 4/70* | (2018.01) |
| *H04W 4/80* | (2018.01) |
| *H04W 8/24* | (2009.01) |

(Continued)

(52) U.S. Cl.
CPC ......... *H04W 72/1273* (2013.01); *H04W 4/70* (2018.02); *H04W 4/80* (2018.02); *H04W 8/24* (2013.01); *H04W 72/535* (2023.01)

(58) Field of Classification Search
CPC ..... H04W 72/1273; H04W 4/70; H04W 4/80; H04W 72/535; H04W 8/24
See application file for complete search history.

(56) References Cited

U.S. PATENT DOCUMENTS

| | | | |
|---|---|---|---|
| 2012/0314589 A1* | 12/2012 | Chen | H04W 24/10 |
| | | | 455/67.11 |
| 2013/0195087 A1 | 8/2013 | Jamadagni et al. | |
| 2013/0294363 A1 | 11/2013 | Feng et al. | |

(Continued)

FOREIGN PATENT DOCUMENTS

| | | |
|---|---|---|
| CN | 1914869 A | 2/2007 |
| CN | 101272233 A | 9/2008 |

(Continued)

OTHER PUBLICATIONS

State Intellectual Property Office of the People's Republic of China, Office Action and Search Report Issued in Application No. 201880001645.3, Mar. 2, 2021, 17 pages.

(Continued)

*Primary Examiner* — Dai Phuong
(74) *Attorney, Agent, or Firm* — Finnegan, Henderson, Farabow, Garrett & Dunner, L.L.P.

(57) ABSTRACT

A method of processing transmission blocks, applied to user equipment, includes: receiving a scheduling signaling from a base station, wherein the scheduling signaling is configured to schedule a plurality of transmission blocks; and performing a transmission on the plurality of transmission blocks with the base station, wherein two adjacent transmission blocks of the plurality of transmission blocks are spaced by a preset time interval; and the transmission is one of an uplink transmission or a downlink transmission.

20 Claims, 17 Drawing Sheets

Receive a scheduling signaling from a base station, where the scheduling signaling is configured to schedule a plurality of transmission blocks — S1

Transmit the plurality of transmission blocks to the base station and/or receive the plurality of transmission blocks from the base station, where two adjacent transmission blocks of the plurality of transmission blocks are spaced by a preset time interval — S2

(51) Int. Cl.
　　　*H04W 72/1273*　　(2023.01)
　　　*H04W 72/50*　　　(2023.01)

(56) References Cited

U.S. PATENT DOCUMENTS

| | | | |
|---|---|---|---|
| 2016/0353394 | A1 | 12/2016 | Tadano |
| 2017/0202008 | A1* | 7/2017 | Nader .................. H04L 1/1887 |
| 2018/0020447 | A1 | 1/2018 | Thubert et al. |
| 2018/0115991 | A1 | 4/2018 | Yang et al. |
| 2019/0319699 | A1* | 10/2019 | Lee ..................... H04L 27/2666 |
| 2020/0008260 | A1* | 1/2020 | Islam .................. H04B 17/309 |
| 2021/0243793 | A1* | 8/2021 | Ang .................. H04W 72/0446 |

FOREIGN PATENT DOCUMENTS

| | | | |
|---|---|---|---|
| CN | 101516104 | A | 8/2009 |
| CN | 101610574 | A | 12/2009 |
| CN | 102447546 | A | 5/2012 |
| CN | 102474463 | A | 5/2012 |
| CN | 103220722 | A | 7/2013 |
| CN | 103428777 | A | 12/2013 |
| CN | 106330389 | A | 1/2017 |
| CN | 106688203 | A | 5/2017 |
| CN | 107770869 | A | 3/2018 |
| CN | 107925459 | A | 4/2018 |
| CN | 108023666 | A | 5/2018 |
| GB | 2541213 | A | 2/2017 |
| KR | 20150004752 | A | 1/2015 |
| KR | 20150122790 | A | 11/2015 |
| KR | 20150140834 | A | 12/2015 |
| RU | 2579356 | C2 | 4/2016 |
| WO | WO 2005/032075 | A1 | 4/2005 |
| WO | WO 2012/050383 | A2 | 4/2012 |
| WO | WO 2017/026126 | A1 | 2/2017 |
| WO | WO 2017/167252 | A1 | 10/2017 |
| WO | WO 2018/115106 | A1 | 6/2018 |
| WO | WO 2018/119756 | * | 7/2018 ............ H04W 24/08 |
| WO | WO 2018/119756 | A1 | 7/2018 |

OTHER PUBLICATIONS

European Patent Office, Extended European Search Report Issued in Application No. 18928353.4, Jul. 26, 2021, 9 pages.
ISA State Intellectual Property Office of the People's Republic of China, Written Opinion of the International Searching Authority Issued in Application No. PCT/CN2018/097811, Apr. 28, 2019, WIPO, 8 pages.
Georgios Orfanos et al, "A Centralized MAC Protocol with QoS Support for Wireless LANs", IEEE International Symposium on Personal, Indoor and Mobile Radio Communications, Sep. 1, 2007, 5 pages.
State Intellectual Property Office of the People's Republic of China, Office Action and Search Report Issued in Application No. 201880001645.3, Apr. 24, 2020, 12 pages.
ISA State Intellectual Property Office of the People's Republic of China, International Search Report Issued in Application No. PCT/CN2018/097811, Apr. 28, 2019, WIPO, 4 pages.
Examination Report for Indian Application No. 202147007817, issued on Jan. 25, 2022, 6 pages.
Notice of Reasons for Refusal for Japanese Application No. 2021-505187, issued on Mar. 22, 2022, 8 pages.
ZTE, "SC-MTCH Tranmission Reliability", 3GPP TSG-RAN WG2 Meeting#96, R2-167685, Reno, USA, Nov. 14-18, 2016, 6 pages.
State Intellectual Property Office of the People's Republic of China, Office Action and Search Report issued in Application No. 2021112897770, Sep. 5, 2023, 14 pages.
Indonesia Patent Office, Office Action issued in Application No. P00202101417, Oct. 19, 2023, 4 pages.
European Patent Office, Office Action issued in Application No. 18928353.4, May 3, 2023, Netherlands, 5 pages.
Zeyong Zhang, "Analysis of NB-IoT channel NB-PDCCH and resource scheduling principles", Communication Design and Applications 107, Jun. 25, 2018, 6 pages.
Qiang Guo et al, "Synchronization of Network Covert Time Channel Based on Smoothing Estimation Algorithm", vol. 35. No. 1, Computer Engineering, Jan. 5, 2009, 3 pages.
ZTE, "Discussion on transmission reliability of SC-PTM", 3GPP TSG-RAN WG2 Meeting#95bis, Kaohsiung, Oct. 10-14, 2016, R2-166129, 5 pages.
Korean Intellectual Property Office, Office Action issued in Application No. 10-2021-7004869, Nov. 30, 2023, 11 pages.
AT&T, "Transmission duration indication for symbol-level/slot-level/multi-slot-level scheduling", R1-1712720, 3GPP TSG RAN WG1 Meeting #90, Prague, Czech Republic, Aug. 21-25, 2017, 5 pages.
LG Electronics, "Discussion on multi-slot/cross-slot scheduling for NR", R1-1707651, 3GPP TSG RAN WG1 Meeting #89, Hangzhou, P.R. China May 15-19, 2017, 4 pages.
Gou Ding-yong et al., "Transport Block Based Scheduling Algorithm for WCDMA Uplink Load Control", Journal of Electronics & Information Technology, vol. 26No. 3, Mar. 2004, 8 pages.
Zhang Lei et al, "A Novel Hybrid Modulation Scheme for Pilot-assisted Block Transmission Technology", Journal of Electronics & Information Technology, vol. 30No. 4, Apr. 2008, 5 pages.
Kang Jun et al, "Scheme of bandwidth scheduling for networked control systems in accordance with temporal distance constraint", Control and Decision, vol. 24 No. 5, May 2009, 7 pages.

* cited by examiner

TRANSMISSION BLOCK PROCESSING METHOD AND APPARATUS, ELECTRONIC DEVICE AND COMPUTER-READABLE STORAGE MEDIUM

CROSS-REFERENCE TO RELATED APPLICATION

This application is a continuation application of International Application No. PCT/CN2018/097811, filed on Jul. 31, 2018, the disclosure of which is incorporated herein by reference in its entirety for all purposes.

TECHNICAL FIELD

The present disclosure relates to the field of communication technologies, and in particular, to methods, apparatuses, electronic devices and computer-readable storage media for processing transmission blocks.

BACKGROUND

Internet of Things (IoT) grows rapidly in recent years. A Machine Type Communication (MTC) technology and a Narrow Band Internet of Things (NB-IoT) technology are typical representatives of cellular Internet of Things technologies. Since the MTC/NB-IoT is widely applied to scenarios (for example, data collection) that mostly do not require high communication capabilities, user equipment for the MTC/NB-IoT doesn't require high communication capability. Thus, for the sake of cost, compared with an ordinary mobile phone, the user equipment for the MTC/NB-IoT allows a great decline in processing capability.

In an MTC/NB-IoT application scenario, for being transmitted from or received by the user equipment, a data packet is divided into a plurality of transmission blocks (TBs). Each transmission block is scheduled through an individual signaling on which a respective blind detection is performed by the user equipment, which results in more power consumption.

In order to overcome the above problems, in a related art, a plurality of transmission blocks are continuously scheduled through one signaling, so that a number of the blind detections performed by the user equipment can be reduced. However, other problems may be introduced due to insufficient processing capabilities of the user equipment.

SUMMARY

Embodiments of the present disclosure provide methods and apparatuses for processing transmission blocks, electronic devices, and computer-readable storage media.

According to a first aspect of the embodiments of the present disclosure, a method of processing transmission blocks, applied to user equipment, includes: receiving a scheduling signaling from a base station, wherein the scheduling signaling is configured to schedule a plurality of transmission blocks; and performing a transmission on the plurality of transmission blocks with the base station, wherein two adjacent transmission blocks of the plurality of transmission blocks are spaced by a preset time interval; and the transmission is one of an uplink transmission or a downlink transmission.

According to a second aspect of the embodiments of the present disclosure, a method of processing transmission blocks, applied to a base station, includes: sending a scheduling signaling to user equipment, wherein the scheduling signaling is configured to schedule a plurality of transmission blocks; and performing a transmission on the plurality of transmission blocks with the user equipment, wherein two adjacent transmission blocks of the plurality of transmission blocks are spaced by a preset time interval; and the transmission is one of an uplink transmission or a downlink transmission.

According to a third aspect of the embodiments of the present disclosure, a method of processing transmission blocks, applied to user equipment, includes: receiving a scheduling signaling from a base station, wherein the scheduling signaling is configured to schedule a plurality of transmission blocks; and performing a transmission on the plurality of transmission blocks with the base station; wherein two adjacent transmission blocks of the plurality of transmission blocks are spaced by a preset time interval; the transmission is one of an uplink transmission or a downlink transmission; no transmission is performed during the preset time interval; and the user equipment is a Narrow Band Internet of Things (NB-IoT) type device, or a Machine Type Communication (MTC) type device.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
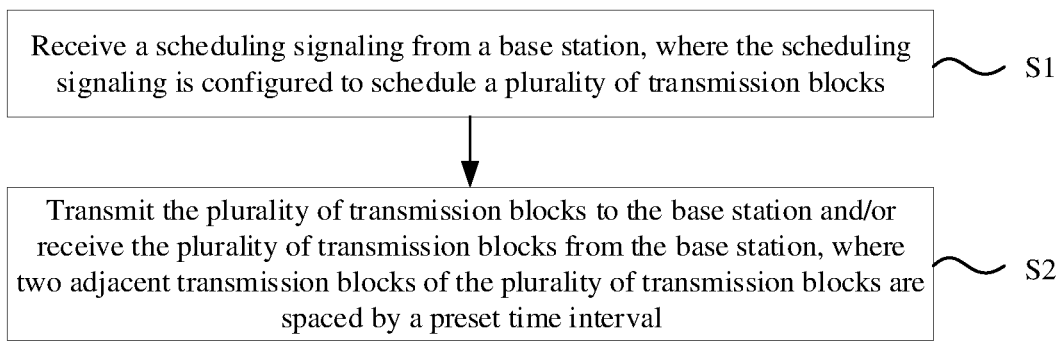
FIG. 1 is a flowchart illustrating a method of processing transmission blocks according to an example of the present disclosure.

FIG. 1 is a flowchart illustrating a method of processing transmission blocks according to an example of the present disclosure. The method illustrated in the example may be applied to user equipment. The user equipment may implement its communication based on MTC and/or NB-IoT technologies, with a lower data processing capability than a general mobile phone.

As illustrated in FIG. 1, the method of processing transmission blocks according to the example may include the following steps.

At step S1, a scheduling signaling is received from a base station, where the scheduling signaling is configured to schedule a plurality of transmission blocks. In some embodiments, for each of the transmission blocks, its data size may be identical with or different from another one, without being limited by the present disclosure.

At step S2, the plurality of transmission blocks are transmitted to the base station and/or the plurality of transmission blocks are received from the base station, where two adjacent transmission blocks of the plurality of transmission blocks are spaced by a preset time interval.

Figure 2A:
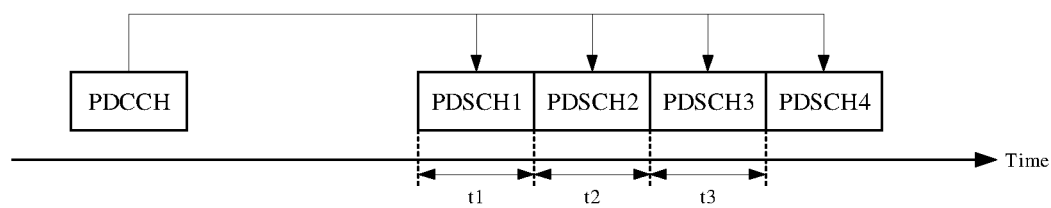
FIG. 2A is a schematic diagram illustrating receiving transmission blocks in the related art.

Regardless of whether the user equipment transmits the plurality of transmission blocks to the base station or receives the plurality of transmission blocks from the base station, the user equipment processes resources on which the transmission blocks are carried. FIG. 2A is a schematic diagram illustrating receiving transmission blocks in the related arts. As illustrated in FIG. 2A, for example, 4 transmission blocks are received from the base station, which respectively correspond to physical downlink shared channel (PDSCH) resources: PDSCH1, PDSCH2, PDSCH3, and PDSCH4. The 4 transmission blocks are continuously scheduled through a physical downlink control channel (PDCCH) signaling, and thus the resources respectively corresponding to the 4 transmission blocks are not to be spaced in time since the 4 transmission blocks are continuously scheduled. Meanwhile, the transmission blocks corresponding to the PDSCH resources may not be obtained unless the user equipment performs operations such as demodulating the PDSCH resources.

In the case that the user equipment has a low data processing capability, i.e., a slow data processing speed, the user equipment may not complete demodulating the PDSCH1 to obtain the first transmission block within a time period t1 corresponding to the PDSCH1. Considering that the user equipment has received the PDSCH2 before receiving the PDSCH3, if the first transmission block is not demodulated from the PDSCH1 until the user equipment receives the PDSCH3, it is possible that the user equipment ignores the PDSCH2 and only demodulates the PDSCH3 that is most recently received, which may result in fewer demodulated transmission blocks than the transmission blocks transmitted from the base station.

According to some examples of the present disclosure, two adjacent transmission blocks of the transmission blocks are spaced by the preset time interval. Therefore, compared with the case that the transmission blocks are continuously scheduled in the related art, the user equipment can take more time to process the resource corresponding to each of the transmission blocks, so as to ensure that the transmission blocks are transmitted and received well. That is, no transmission is performed during the preset time interval.

Figure 2B:
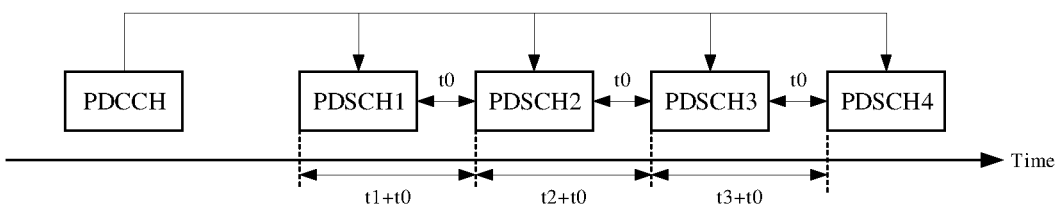
FIG. 2B is a schematic diagram illustrating receiving transmission blocks according to an example of the present disclosure.

FIG. 2B is a schematic diagram illustrating receiving transmission blocks according to an example of the present disclosure. As illustrated in FIG. 2B, for example, receiving the 4 transmission blocks from the base station is still taken as an example. Since in the plurality of transmission blocks, two adjacent transmission blocks are spaced by the preset time interval t0, a time period between receiving the PDSCH1 and receiving the PDSCH2, t1+t0, is given to the user equipment to demodulate the first transmission block from the PDSCH1. Therefore, it can be guaranteed to a large extent that when receiving the PDSCH2, the user equipment has completed the demodulation of another PDSCH resource and thus can demodulate the PDSCH2. Accordingly, it can be guaranteed that the 4 transmission blocks are demodulated by the user equipment, so as to ensure that the transmission blocks are received well.

Figure 3:
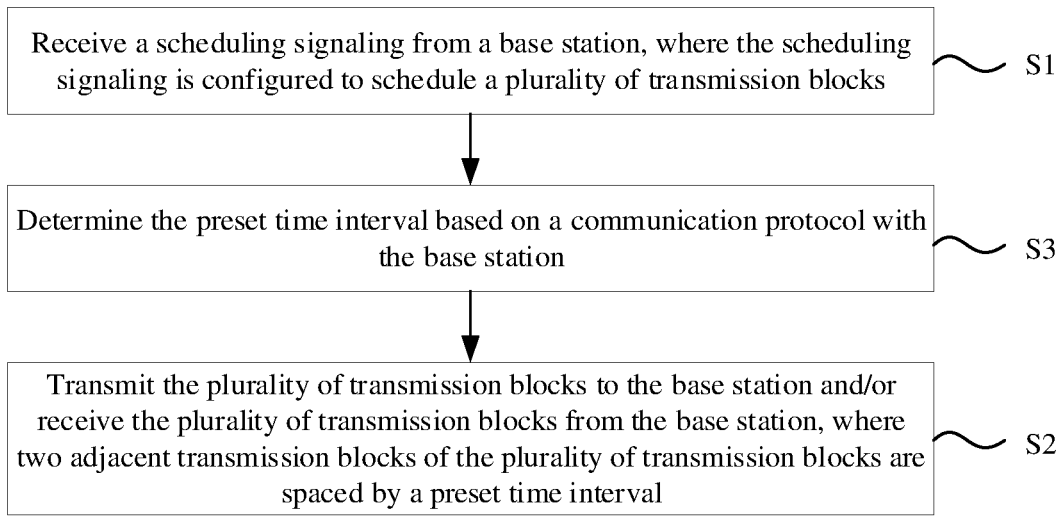
FIG. 3 is a flowchart illustrating a method of processing transmission blocks according to an example of the present disclosure.

FIG. 3 is a flowchart illustrating a method of processing transmission blocks according to an example of the present disclosure. As illustrated in FIG. 3, on the basis of the example illustrated in FIG. 1, the method further includes: at step S3, the preset time interval is determined based on a communication protocol with the base station before the plurality of transmission blocks are transmitted to the base station or received from the base station.

In one embodiment, the preset time interval may be configured in the communication protocol between the base station and the user equipment in advance, so that the user equipment can directly determine the preset time interval based on the communication protocol when communicating with the base station. In some embodiments, the user equipment may determine the preset time interval before transmitting the plurality of transmission blocks to the base station, or the user equipment may determine the preset time interval before receiving the plurality of transmission blocks from the base station.

Figure 4:
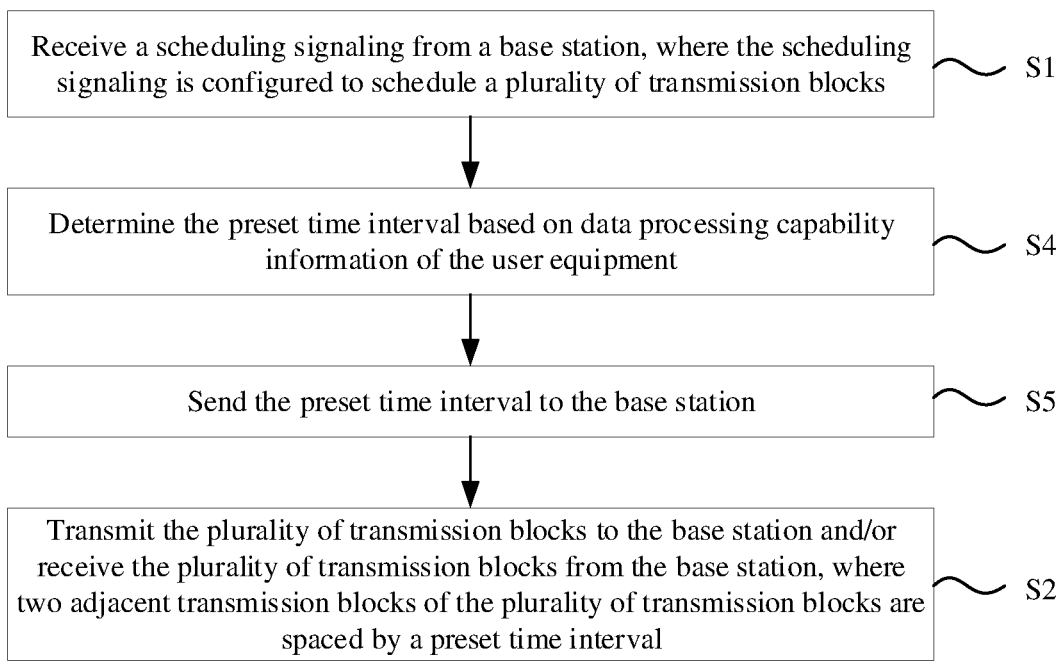
FIG. 4 is a flowchart illustrating a method of processing transmission blocks according to an example of the present disclosure.

FIG. 4 is a flowchart illustrating a method of processing transmission blocks according to an example of the present disclosure. As illustrated in FIG. 4, on the basis of the example illustrated in FIG. 1, the method further includes: at step S4, the preset time interval is determined based on data processing capability information of the user equipment before transmitting the plurality of transmission blocks to the base station or receiving the plurality of transmission blocks from the base station; and at step S5, the preset time interval is sent to the base station.

In one embodiment, the user equipment may determine the preset time interval based on its own data processing capability information. For example, the weaker the data processing capability is, the longer the determined preset time interval may be, while the stronger the data processing capability is, the shorter the determined preset time interval may be. Then, the determined preset time interval may be sent to the base station, so that the base station may also transmit and receive transmission blocks based on the preset time interval, and thereby communicates with the user equipment well. In some embodiments, the user equipment may send the preset time interval to the base station before transmitting the plurality of transmission blocks to the base station, or the user equipment may send the preset time interval to the base station before receiving the plurality of transmission blocks from the base station.

The user equipment may perform sending the preset time interval to the base station after receiving a trigger message from the base station, or may actively perform it as required, e.g., when a communication connection with the base station is established.

Figure 5:
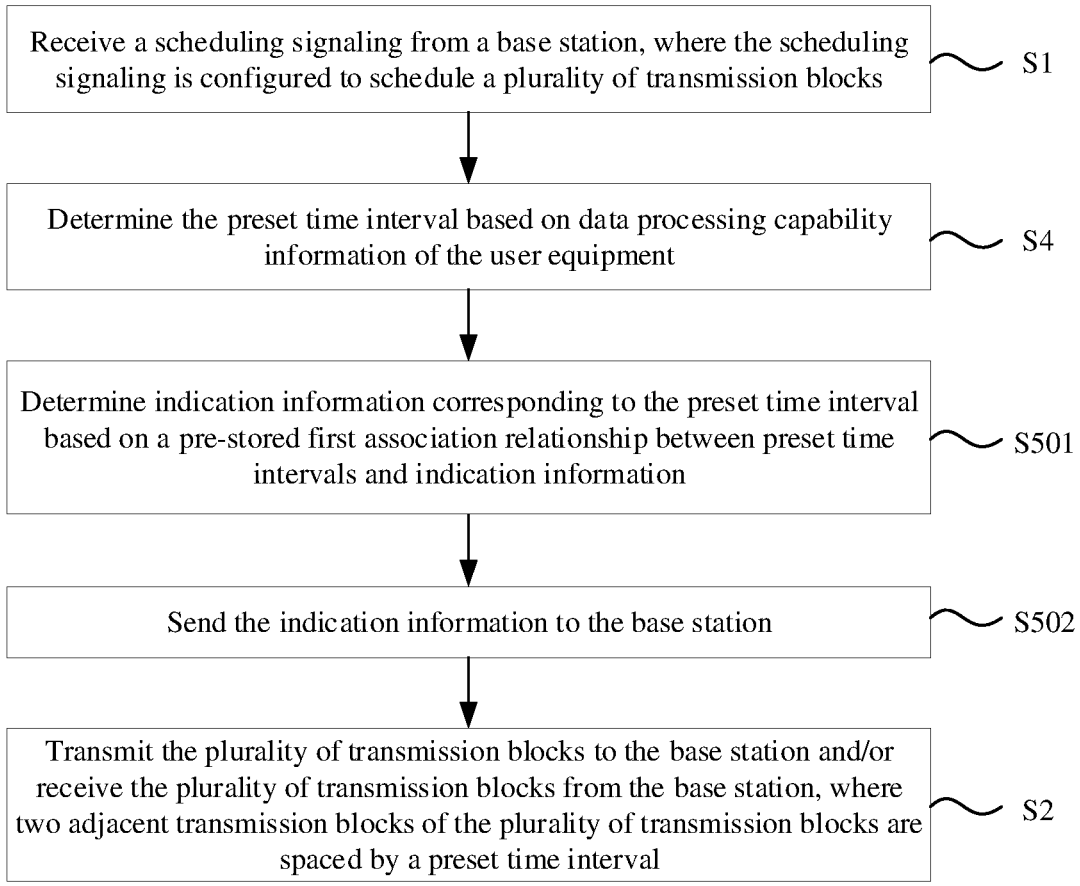
FIG. 5 is a flowchart illustrating a method of processing transmission blocks according to an example of the present disclosure.

FIG. 5 is a flowchart illustrating a method of processing transmission blocks according to an example of the present disclosure. As illustrated in FIG. 5, on the basis of the example illustrated in FIG. 4, that the preset time interval is sent to the base station includes: at step 501, indication information corresponding to the preset time interval is determined based on a pre-stored first association relationship between preset time intervals and indication information; and at step S502, the indication information is sent to the base station; where the first association relationship is also pre-stored in the base station.

In one embodiment, the user equipment may first determine the indication information corresponding to the preset time interval and then send the indication information to the base station. Since the base station stores the first association relationship in advance, after receiving the indication information, the base station can determine the preset time interval corresponding to the indication information. Therefore, the base station may also transmit and receive transmission blocks based on the preset time interval, and thereby communicates with the user equipment well.

For example, the first association relationship may be shown in Table 1:

TABLE 1

| Indication Information | Preset Time Interval |
|---|---|
| 1 | 1 ms |
| 2 | 2 ms |
| 3 | 3 ms |

If an indicator sent by the user equipment is 2, the base station may determine based on the first association relationship that the user equipment is to receive and transmit the transmission blocks by the preset time interval of 2 milliseconds.

Figure 6:
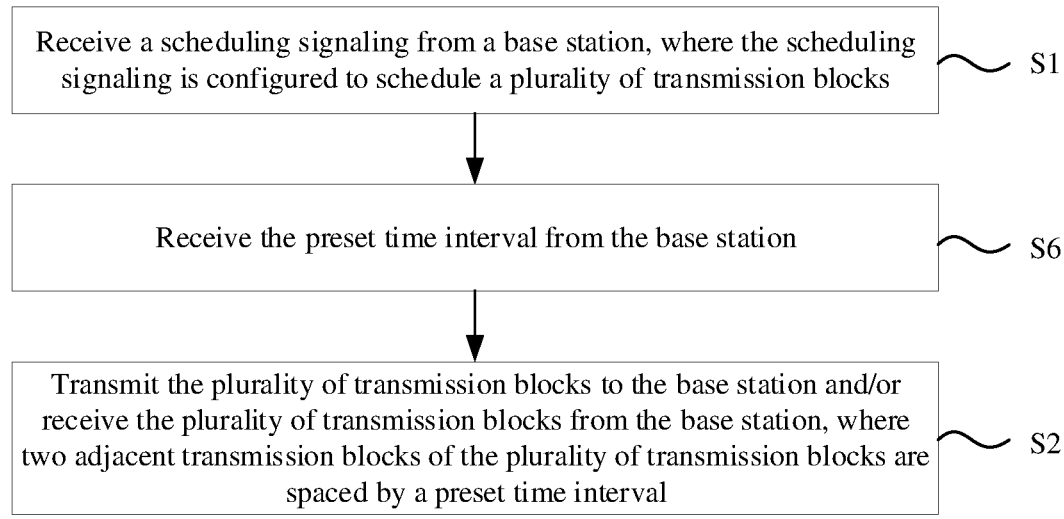
FIG. 6 is a flowchart illustrating a method of processing transmission blocks according to an example of the present disclosure.

FIG. 6 is a flowchart illustrating a method of processing transmission blocks according to an example of the present disclosure. As illustrated in FIG. 6, on the basis of the example illustrated in FIG. 1, the method further includes: at step S6, the preset time interval is received from the base station before the plurality of transmission blocks are transmitted to the base station or received from the base station.

In one embodiment, the preset time interval may also be configured by the base station and sent to the user equipment, so that the user equipment can transmit and receive the transmission blocks based on the preset time interval. In some embodiments, the user equipment may receive the preset time interval from the base station before transmitting the plurality of transmission blocks to the base station, or the user equipment may receive the preset time interval from the base station before receiving the plurality of transmission blocks from the base station.

Figure 7:
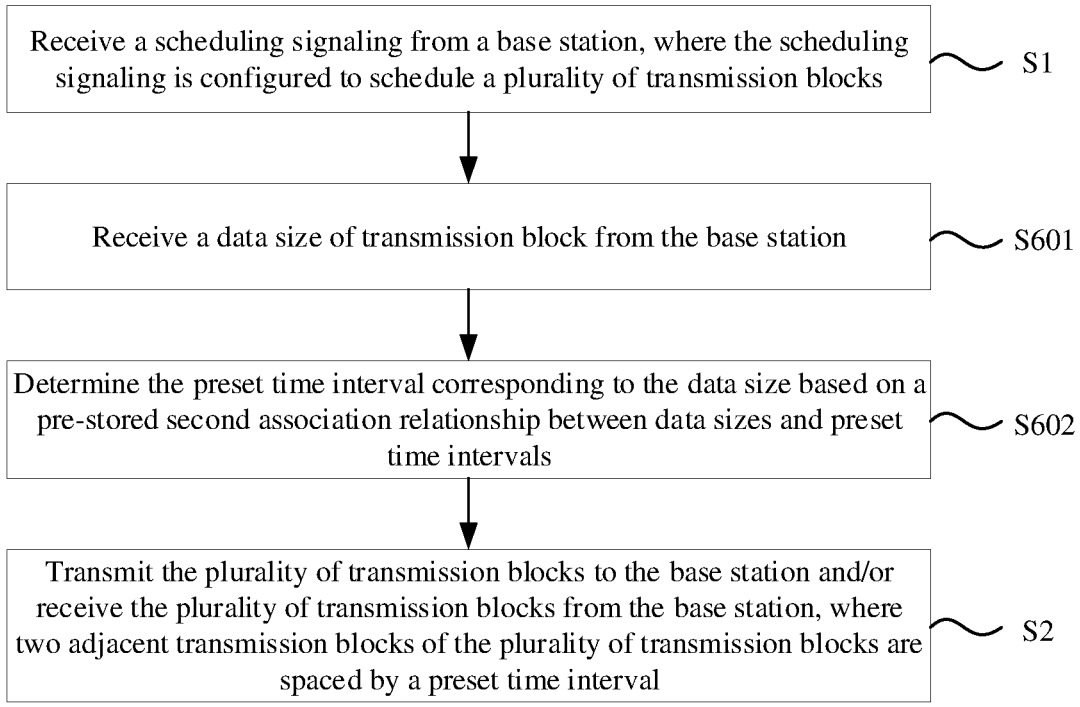
FIG. 7 is a flowchart illustrating a method of processing transmission blocks according to an example of the present disclosure.

FIG. 7 is a flowchart illustrating a method of processing transmission blocks according to an example of the present disclosure. As illustrated in FIG. 7, on the basis of the example illustrated in FIG. 6, that the preset time interval is received from the base station includes: at step S601, a data size of transmission block is received from the base station; and at step S602, the preset time interval corresponding to the data size is determined based on a pre-stored second association relationship between data sizes and preset time intervals; where the second association relationship is also pre-stored in the base station.

In one embodiment, the base station may determine the data size of transmission blocks to be sent. In particular, the base station may determine the data size of transmission block based on pre-stored configuration information or based on data processing capability information of the user equipment. Further, data to be transmitted may be divided into the plurality of transmission blocks based on the determined data size.

After receiving the data size of transmission block, the user equipment may determine the preset time interval corresponding to the data size, and then may transmit and receive the transmission blocks based on the preset time interval. Besides, since the base station stores the second association relationship in advance, based on the second association relationship, the base station can determine the preset time interval corresponding to the data size of transmission block sent to the user equipment by it, so that the base station can also transmit and receive transmission blocks by the preset time interval, and thereby ensures that the communication between the base station and the user equipment can work well. In some embodiments, based on the second association relationship, the larger the data size of transmission block is, the longer the determined preset time interval may be, while the smaller the data size of transmission block is, the shorter the determined preset time interval may be.

For example, the second association relationship may be shown in Table 2:

TABLE 2

| Data Size | Preset Time Interval |
|---|---|
| X bits to Y bits | 2 ms |
| Y bits to Z bits | 5 ms |

If the data size of transmission block to be sent is between X bits and Y bits, based on the second association relationship, the user equipment may determine to receive and transmit the transmission blocks by the preset time interval of 2 milliseconds. In some embodiments, the respective values of X, Y, and Z may be configured as required.

Figure 8:
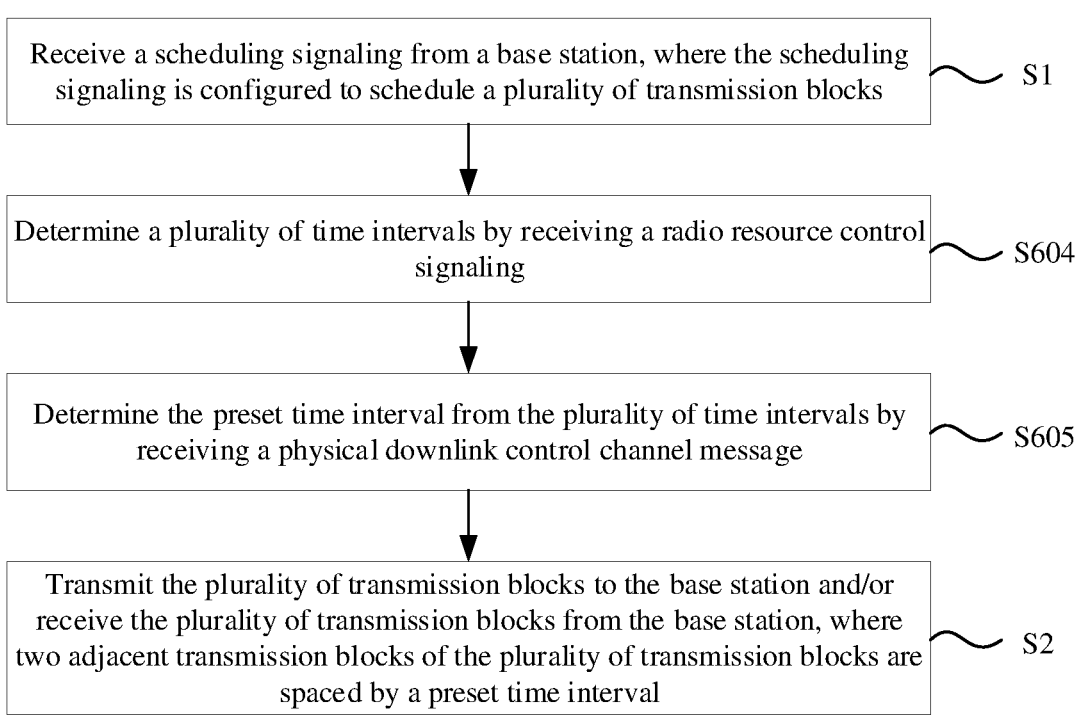
FIG. 8 is a flowchart illustrating a method of processing transmission blocks according to an example of the present disclosure.

FIG. 8 is a flowchart illustrating a method of processing transmission blocks according to an example of the present disclosure. As illustrated in FIG. 8, on the basis of the example illustrated in FIG. 6, that the preset time interval is received from the base station includes: at step 604, a plurality of time intervals are determined by receiving a radio resource control signaling; and at step 605, the preset time interval is determined from the plurality of time intervals by receiving a physical downlink control channel message.

In one embodiment, the base station may first indicate the plurality of time intervals to the user equipment through the radio resource control signaling, and further indicate the preset time interval among the indicated plurality of time intervals through a physical downlink control channel message. Accordingly, the overhead of the physical downlink control message can be reduced.

In some embodiments, the time intervals supported by the user equipment constitute a time interval set, a plurality of first characters may be contained in the radio resource control signaling, and there is a correspondence between first characters and time intervals, so that the user equipment may determine the plurality of time intervals in the time interval set based on the plurality of first characters in accordance with the correspondence between first characters and time intervals. Correspondingly, a second character may be included in the physical downlink control channel message, and there is a correspondence between second characters and time intervals, so that the user equipment may determine the preset time interval from the plurality of time intervals based on the second character in accordance with the correspondence between second characters and time intervals.

For example, the user equipment may support 16 time intervals in total. It occupies 4 bits if the preset time interval is just indicated among the 16 time intervals through the physical downlink control channel message, while only 2 bits if 4 time intervals are first indicated among the 16 time intervals through the radio resource control signaling and then the preset time interval is indicated among the 4 time intervals through the physical download control channel message.

Figure 9:
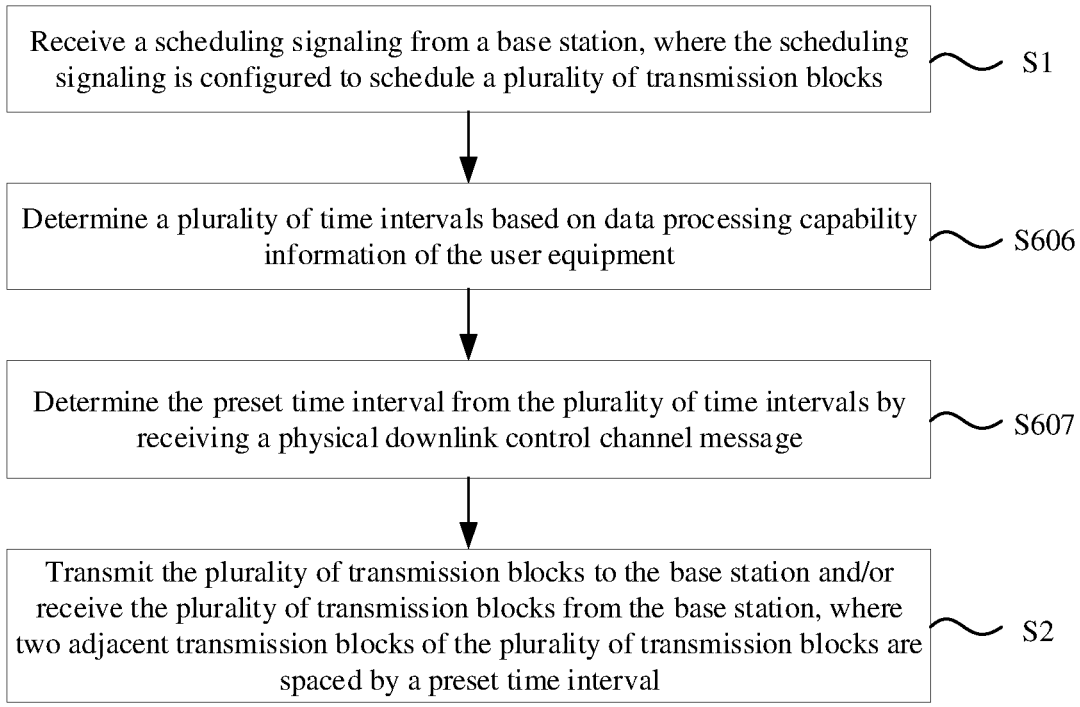
FIG. 9 is a flowchart illustrating a method of processing transmission blocks according to an example of the present disclosure.

FIG. 9 is a flowchart illustrating a method of processing transmission blocks according to an example of the present disclosure. As illustrated in FIG. 9, on the basis of the example illustrated in FIG. 6, that the preset time interval is received from the base station includes: at step S606, a plurality of time intervals are determined based on data processing capability information of the user equipment; and at step S607, the preset time interval is determined from the plurality of time intervals by receiving a radio resource control signaling or a physical downlink control channel message.

In one embodiment, the user equipment may determine the plurality of time intervals based on its own data processing capability information. For example, the user equipment may support 16 time intervals, and accordingly determine 4 time intervals from the 16 time intervals to match its own data processing capability.

In addition, the user equipment may also send its own data processing capability information to the base station, and the base station may determine the plurality of time intervals based on a correspondence between data processing capability information and time intervals as well as based on the received data processing capability information.

Then, the base station may further indicate the preset time interval among the determined plurality of time intervals through the radio resource control signaling or the physical downlink control channel message, which can accordingly reduce the overhead of the physical downlink control message.

In some embodiments, a first character may be included in the radio resource control signaling, and there is a correspondence between first characters and time intervals, so that the user equipment may determine the preset time interval from the plurality of time intervals based on the first character in accordance with the correspondence between first characters and time intervals. A second character may be included in the physical downlink control channel message, and there is a correspondence between second characters and time intervals, so that the user equipment may determine the preset time interval from the plurality of time intervals based on the second character in accordance with the correspondence between second characters and time intervals.

For example, the user equipment may support 16 time intervals in total. It occupies 4 bits if the preset time interval is just indicated among the 16 time intervals through the physical downlink control channel message, while only 2 bits if 4 time intervals are first indicated among the 16 time intervals based on the data processing capability information and then the preset time interval is indicated among the 4 time intervals through the physical download control channel message.

Figure 10:
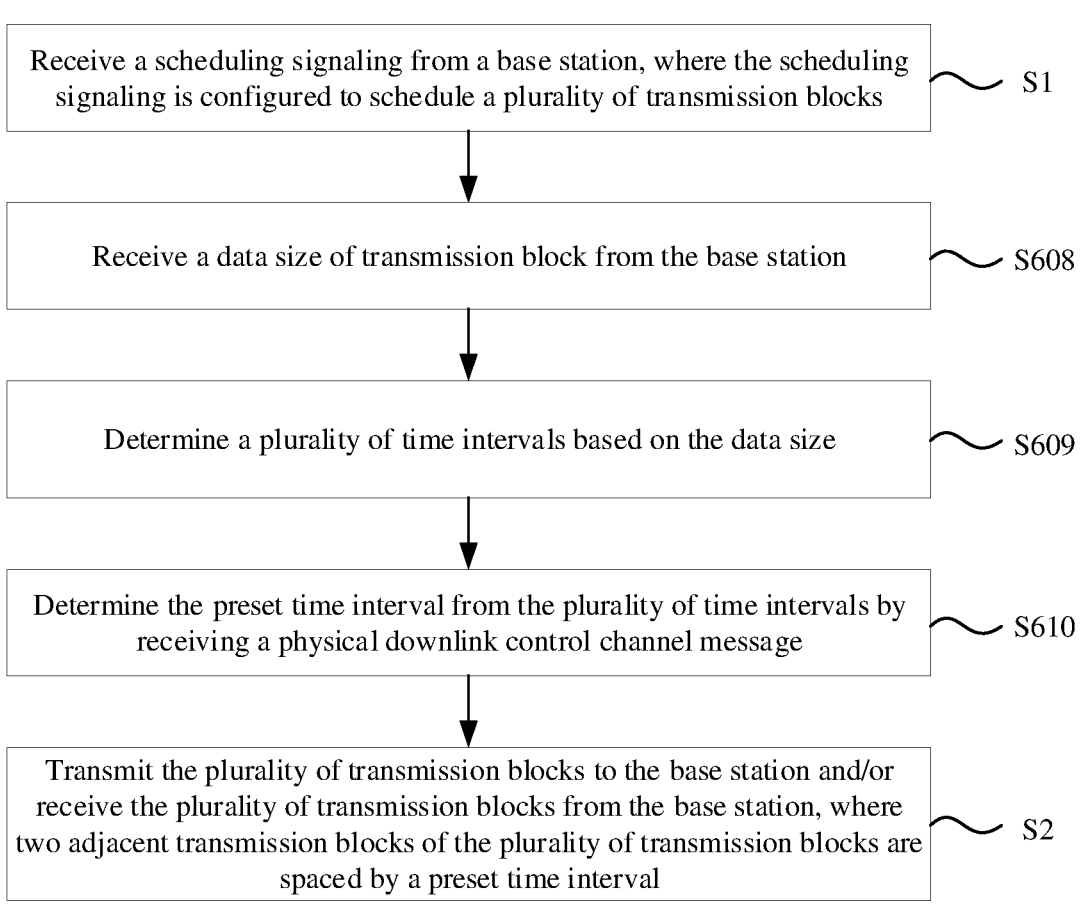
FIG. 10 is a flowchart illustrating a method of processing transmission blocks according to an example of the present disclosure.

FIG. 10 is a flowchart illustrating a method of processing transmission blocks according to an example of the present disclosure. As illustrated in FIG. 10, on the basis of the example illustrated in FIG. 6, that the preset time interval is received from the base station includes: at step S608, a data size of transmission block is received from the base station; at step S609, a plurality of time intervals are determined based on the data size; and at step S610, the preset time interval is determined from the plurality of time intervals by receiving a physical downlink control channel message.

In one embodiment, the base station may determine the data size of transmission block to be sent. For example, the base station may determine the data size of transmission block based on pre-stored configuration information or based on data processing capability information of the user equipment. Further, data to be transmitted may be divided into the plurality of transmission blocks based on the determined data size.

The user equipment may determine the plurality of time intervals based on the data size of transmission block sent by the base station. For example, the user equipment may support 16 time intervals, and accordingly determine 4 time intervals from the 16 time intervals to match the data size of transmission block sent by the base station.

In addition, the base station may further determine the plurality of time intervals based on the determined data size of transmission block in accordance with the correspondence between data sizes of transmission block and time intervals.

Then, the base station may further indicate the preset time interval among the determined plurality of time intervals through a radio resource control signaling or the physical downlink control channel message, which can accordingly reduce the overhead of the physical downlink control message.

In some embodiments, a first character may be included in the radio resource control signaling, and there is a correspondence between first characters and time intervals, so that the user equipment may determine the preset time interval from the plurality of time intervals based on the first character in accordance with the correspondence between first characters and time intervals. A second character may be included in the physical downlink control channel message, and there is a correspondence between second characters and time intervals, so that the user equipment may determine the preset time interval from the plurality of time intervals based on the second character in accordance with the correspondence between second characters and time intervals.

For example, the user equipment may support 16 time intervals in total. It occupies 4 bits if the preset time interval is just indicated among the 16 time intervals through the physical downlink control channel message, while only 2 bits if 4 time intervals are first indicated among the 16 time intervals based on the data size of transmission block and then the preset time interval is indicated among the 4 time intervals through the physical download control channel message.

Figure 11:
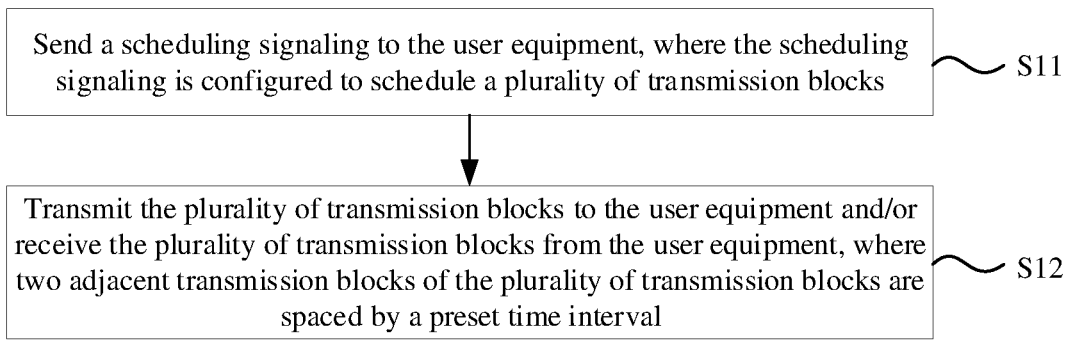
FIG. 11 is a flowchart illustrating a method of processing transmission blocks according to an example of the present disclosure.

FIG. 11 is a flowchart illustrating a method of processing transmission blocks according to an example of the present disclosure. The apparatus for processing transmission blocks illustrated in the example may be applied to a base station. The base station may be a 4G-based base station or a 5G base station. The base station may communicate with the user equipment of the examples illustrated in FIGS. 1-10.

As illustrated in FIG. 11, the method of processing transmission blocks includes: at step S11, a scheduling signaling is sent to the user equipment, where the scheduling signaling is configured to schedule a plurality of transmission blocks; and at step S12, the plurality of transmission blocks are transmitted to the user equipment and/or the plurality of transmission blocks are received from the user equipment, where two adjacent transmission blocks of the plurality of transmission blocks are spaced by a preset time interval.

Figure 12:
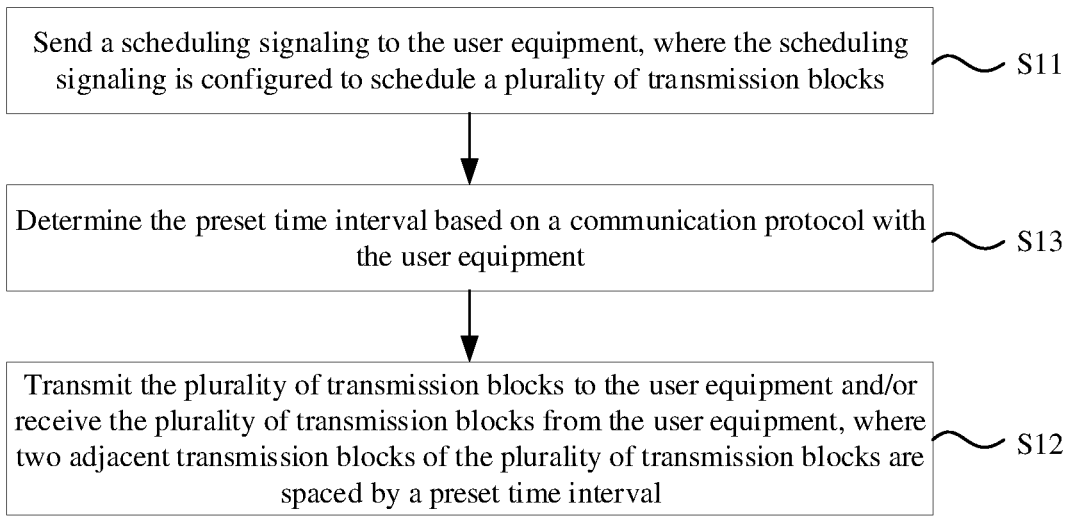
FIG. 12 is a flowchart illustrating a method of processing transmission blocks according to an example of the present disclosure.

FIG. 12 is a flowchart illustrating a method of processing transmission blocks according to an example of the present disclosure. As illustrated in FIG. 12, on the basis of the example illustrated in FIG. 11, the method further includes: at step S13, the preset time interval is determined based on a communication protocol with the user equipment before the plurality of transmission blocks are transmitted to the user equipment or received from the user equipment.

Figure 13:
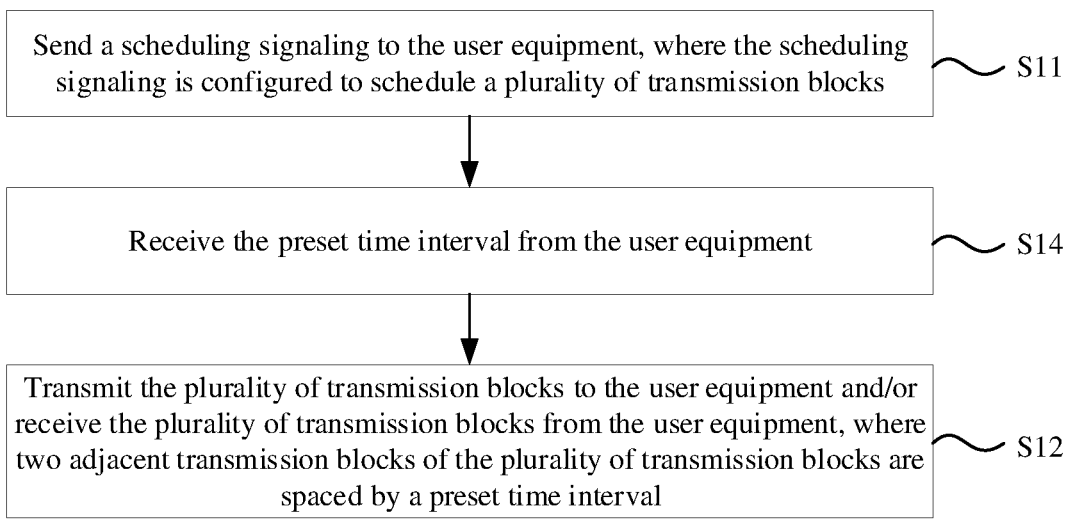
FIG. 13 is a flowchart illustrating a method of processing transmission blocks according to an example of the present disclosure.

FIG. 13 is a flowchart illustrating a method of processing transmission blocks according to an example of the present disclosure. As illustrated in FIG. 13, on the basis of the example illustrated in FIG. 11, the method further includes: at step S14, the preset time interval is received from the user equipment before the plurality of transmission blocks are transmitted to the user equipment or received from the user equipment.

Figure 14:
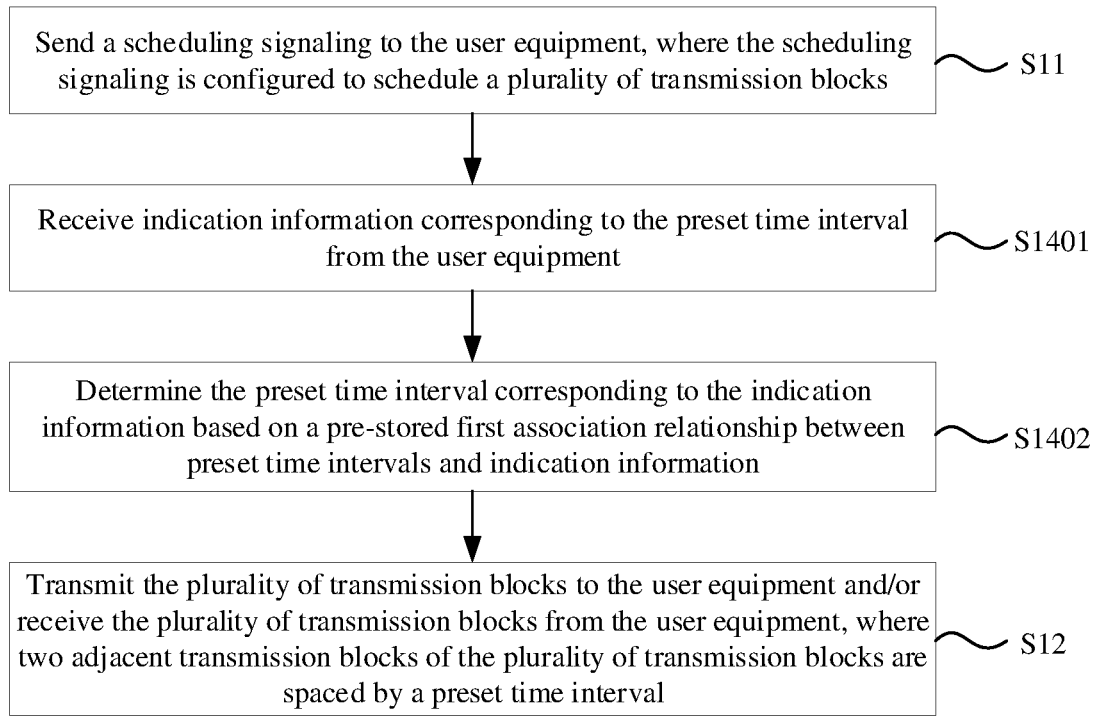
FIG. 14 is a flowchart illustrating a method of processing transmission blocks according to an example of the present disclosure.

FIG. 14 is a flowchart illustrating a method of processing transmission blocks according to an example of the present disclosure. As illustrated in FIG. 14, based on the example illustrated in FIG. 13, that the preset time interval is received from the user equipment includes: at step S1401, indication information corresponding to the preset time interval is received from the user equipment; and at step S1402, the preset time interval corresponding to the indication information is determined based on a pre-stored first association relationship between preset time intervals and indication information.

Figure 15:
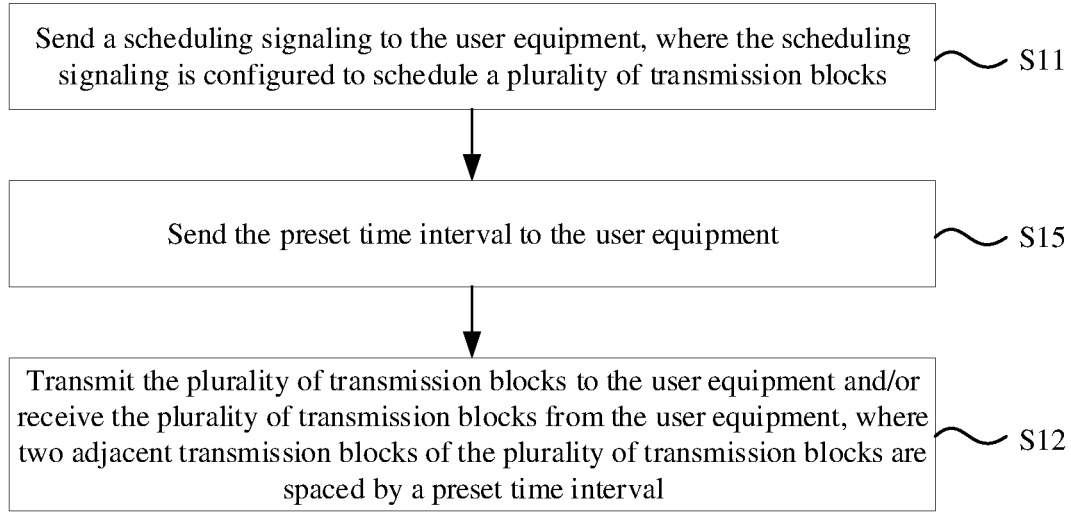
FIG. 15 is a flowchart illustrating a method of processing transmission blocks according to an example of the present disclosure.

FIG. 15 is a flowchart illustrating a method of processing transmission blocks according to an example of the present disclosure. As illustrated in FIG. 15, on the basis of the example illustrated in FIG. 11, the method further includes: at step S15, the preset time interval is sent to the user equipment before the plurality of transmission blocks are transmitted to the user equipment or received from the user equipment.

Figure 16:
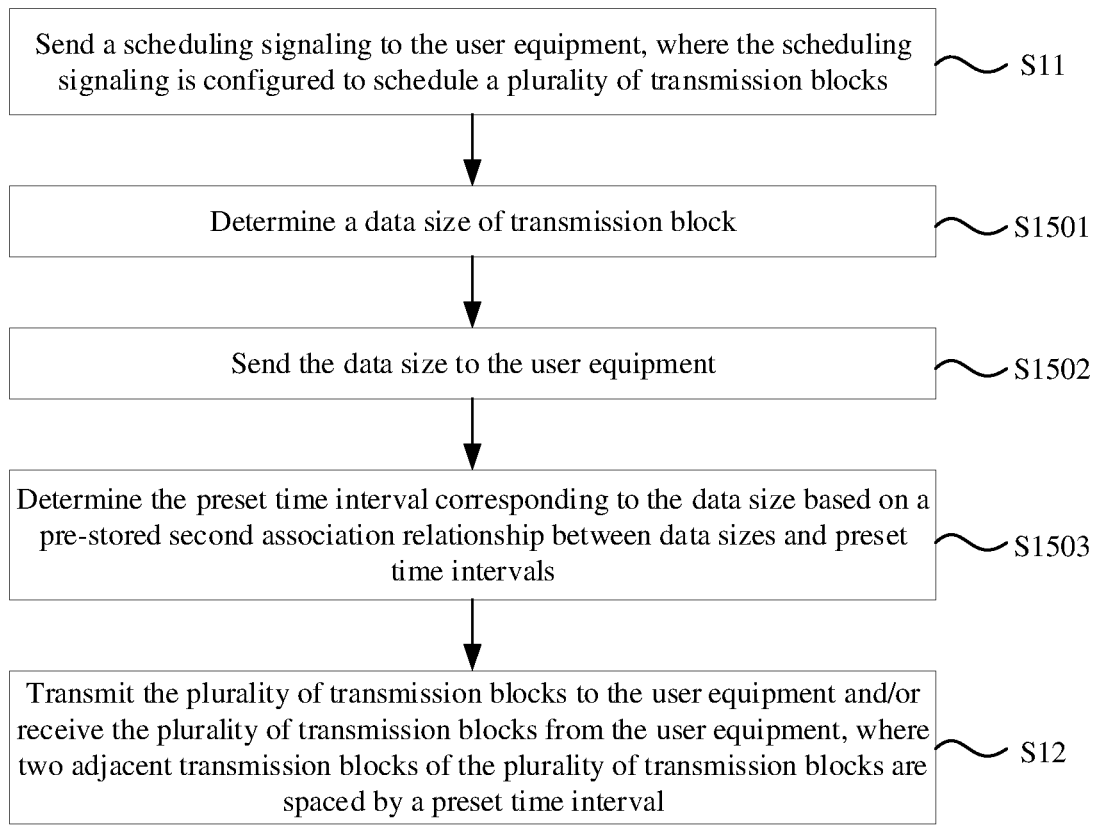
FIG. 16 is a flowchart illustrating a method of processing transmission blocks according to an example of the present disclosure.

FIG. 16 is a flowchart illustrating a method of processing transmission blocks according to an example of the present disclosure. As illustrated in FIG. 16, on the basis of the example illustrated in FIG. 15, that the preset time interval is sent to the user equipment includes: at step S1501, a data size of transmission block is determined; at step S1502, the data size is sent to the user equipment; and at step S1503, the preset time interval corresponding to the data size is determined based on a pre-stored second association relationship between data sizes and preset time intervals; where the second association relationship is also pre-stored in the user equipment.

Figure 17:
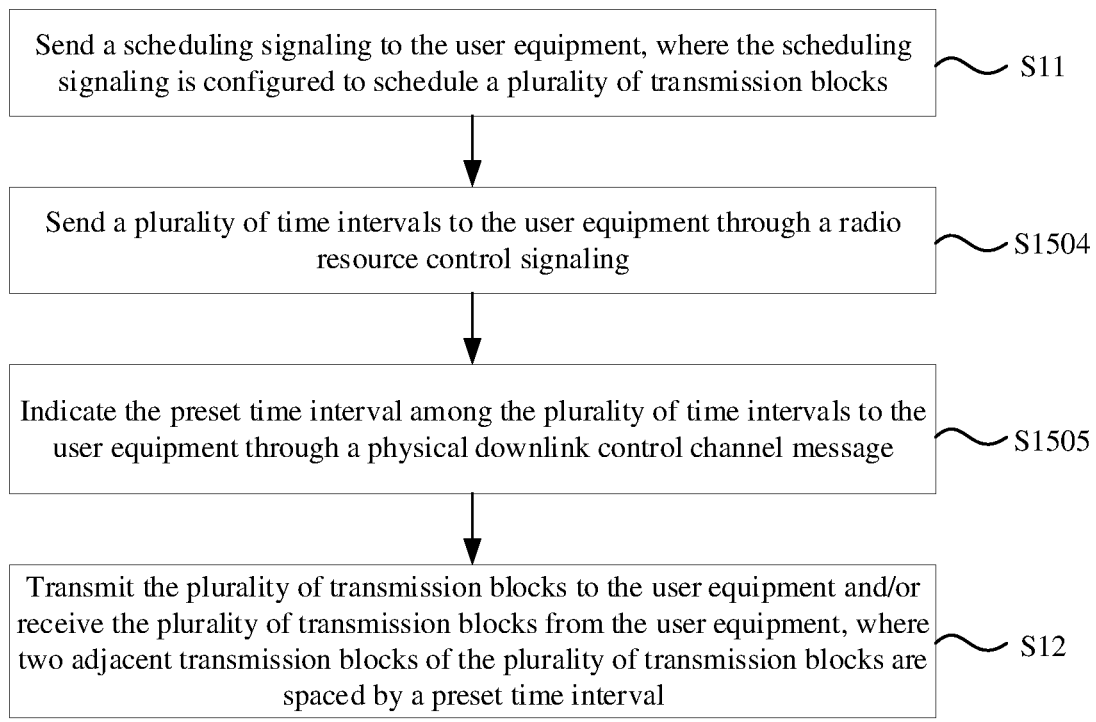
FIG. 17 is a flowchart illustrating a method of processing transmission blocks according to an example of the present disclosure.

FIG. 17 is a flowchart illustrating a method of processing transmission blocks according to an example of the present disclosure. As illustrated in FIG. 17, on the basis of the example illustrated in FIG. 15, that the preset time interval is sent to the user equipment includes: at step S1504, a plurality of time intervals are sent to the user equipment through a radio resource control signaling; and at step S1505, the preset time interval among the plurality of time intervals is indicated to the user equipment through a physical downlink control channel message.

Figure 18:
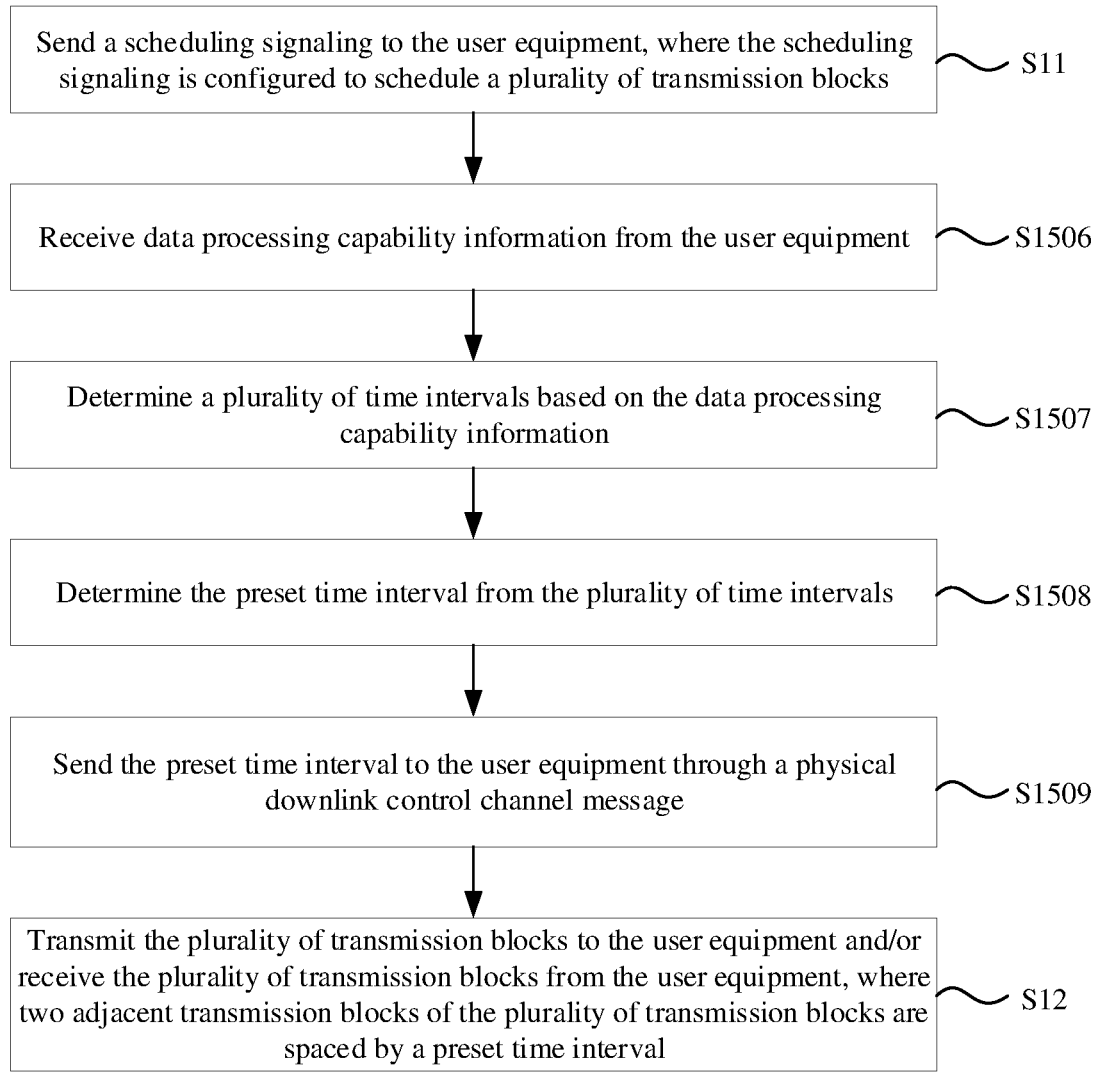
FIG. 18 is a flowchart illustrating a method of processing transmission blocks according to an example of the present disclosure.

FIG. 18 is a flowchart illustrating a method of processing transmission blocks according to an example of the present disclosure. As illustrated in FIG. 18, on the basis of the example illustrated in FIG. 15, that the preset time interval is sent to the user equipment includes: at step S1506, data processing capability information is received from the user equipment; at step S1507, a plurality of time intervals is determined based on the data processing capability information; at step S1508, the preset time interval is determined from the plurality of time intervals; and at step S1509, the preset time interval is sent to the user equipment through a radio resource control signaling or a physical downlink control channel message.

Figure 19:
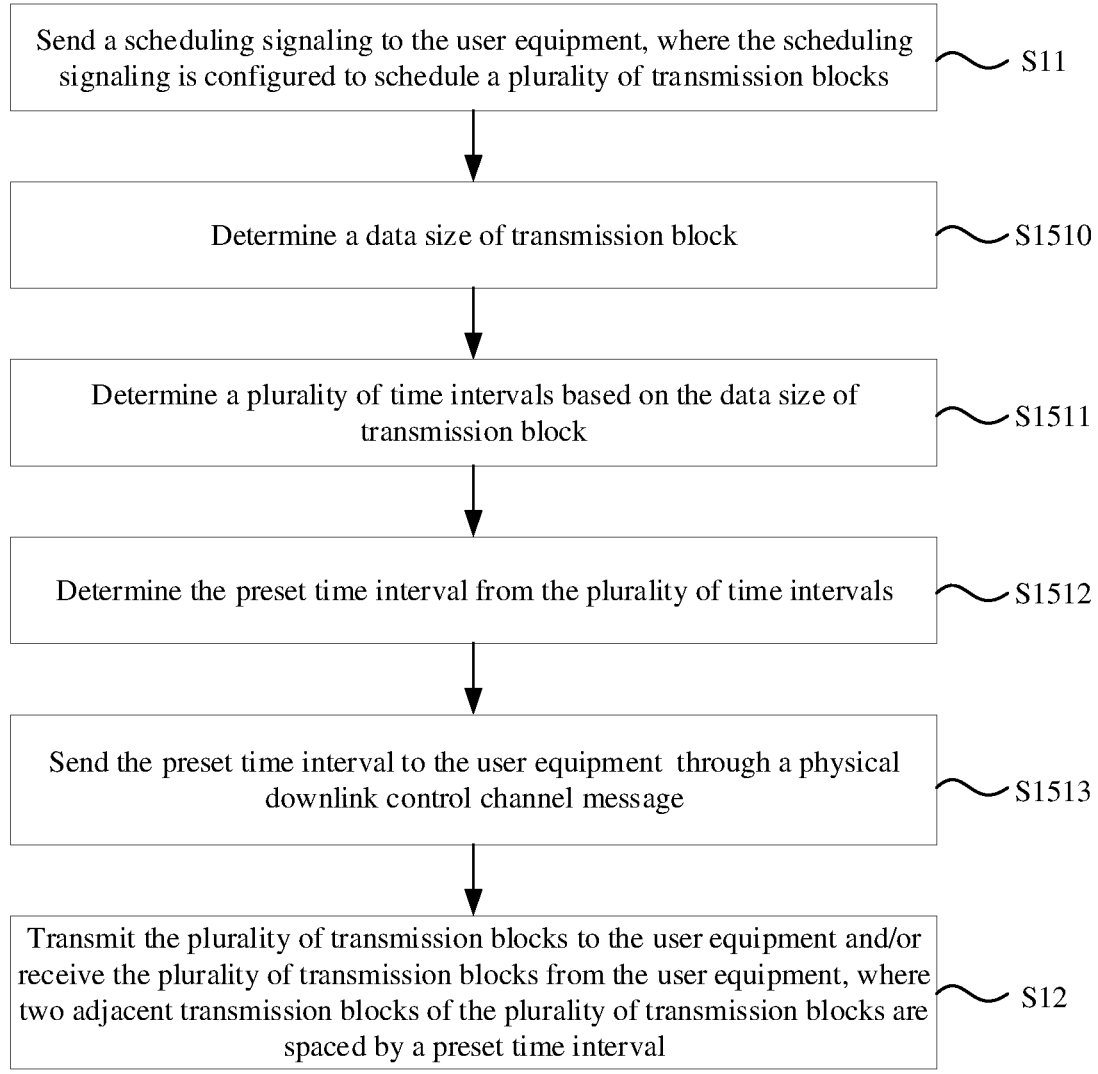
FIG. 19 is a flowchart illustrating a method of processing transmission blocks according to an example of the present disclosure.

FIG. 19 is a flowchart illustrating a method of processing transmission blocks according to an example of the present disclosure. As illustrated in FIG. 19, on the basis of the example illustrated in FIG. 15, that the preset time interval is sent to the user equipment includes: at step S1510, a data size of transmission block is determined; at step S1511, a plurality of time intervals are determined based on the data size of transmission block; at step S1512, the preset time interval is determined from the plurality of time intervals; and at step S1513, the preset time interval is sent to the user equipment through a radio resource control signaling or a physical downlink control channel message.

Corresponding to the foregoing examples of the method of processing transmission blocks, the present disclosure also provides examples of the apparatus for processing transmission blocks.

Figure 20:
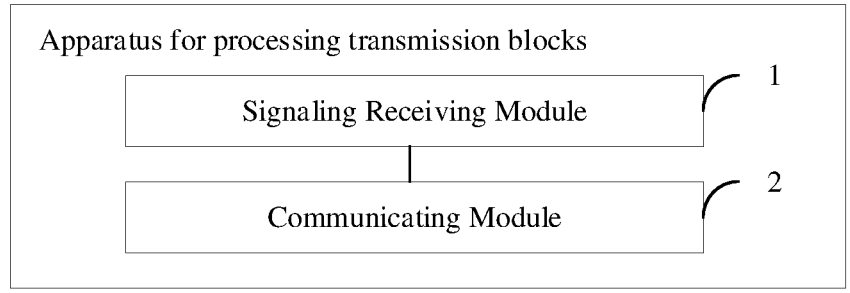
FIG. 20 is a block diagram illustrating an apparatus for processing transmission blocks according to an example of the present disclosure.

FIG. 20 is a block diagram illustrating an apparatus for processing transmission blocks according to an example of the present disclosure. The apparatus illustrated in the example may be applied to user equipment. The user equipment may implement its communication based on MTC and/or NB-IoT technologies, with a lower data processing capability than a general mobile phone.

As illustrated in FIG. 20, the apparatus for processing transmission blocks according to the example may include: a signaling receiving module 1 that is configured to receive a scheduling signaling from a base station, where the scheduling signaling is configured to schedule a plurality of transmission blocks; and a communicating module 2 that is configured to transmit the plurality of transmission blocks to the base station and/or receive the plurality of transmission blocks from the base station, where two adjacent transmission blocks of the plurality of transmission blocks are spaced by a preset time interval.

Figure 21:
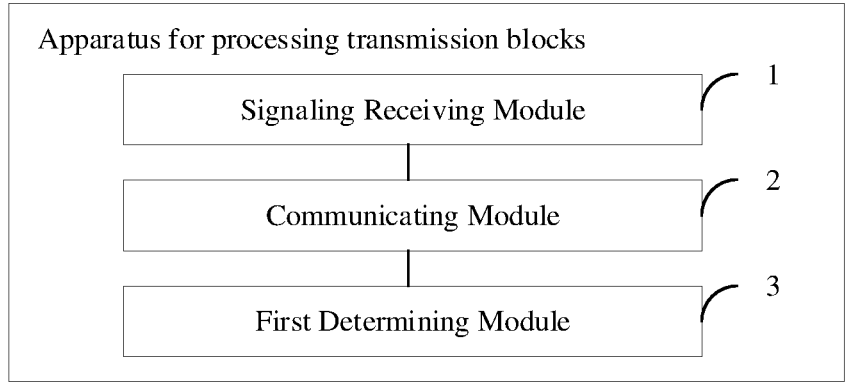
FIG. 21 is a block diagram illustrating an apparatus for processing transmission blocks according to an example of the present disclosure.

FIG. 21 is a block diagram illustrating an apparatus for processing transmission blocks according to an example of the present disclosure. As illustrated in FIG. 21, on the basis of the example illustrated in FIG. 20, the apparatus further includes: a first determining module 3 that is configured to determine the preset time interval based on a communication protocol with the base station before the communicating module 2 transmits the plurality of transmission blocks to the base station or receives the plurality of transmission blocks from the base station.

Figure 22:
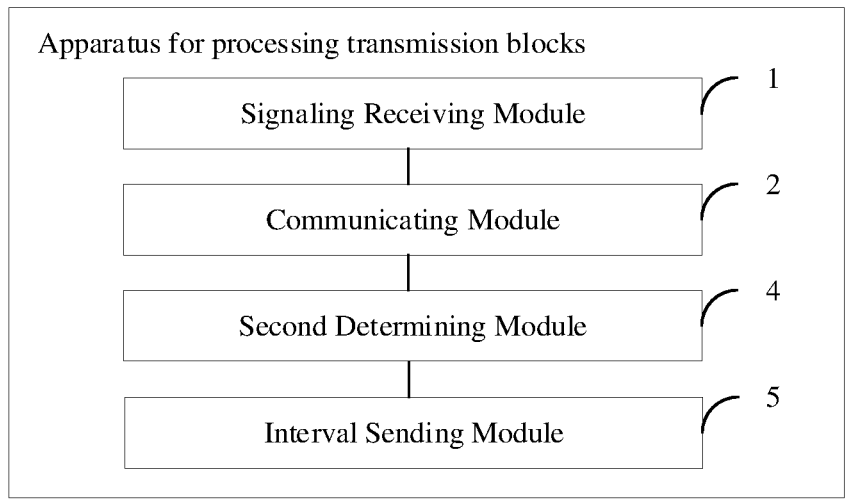
FIG. 22 is a block diagram illustrating an apparatus for processing transmission blocks according to an example of the present disclosure.

FIG. 22 is a block diagram illustrating an apparatus for processing transmission blocks according to an example of the present disclosure. As illustrated in FIG. 22, on the basis of the example illustrated in FIG. 20, the apparatus further includes: a second determining module 4 that is configured to determine the preset time interval based on data processing capability information of the user equipment before the communicating module 2 transmits the plurality of transmission blocks to the base station or receives the plurality of transmission blocks from the base station; and an interval sending module 5 that is configured to send the preset time interval to the base station.

Figure 23:
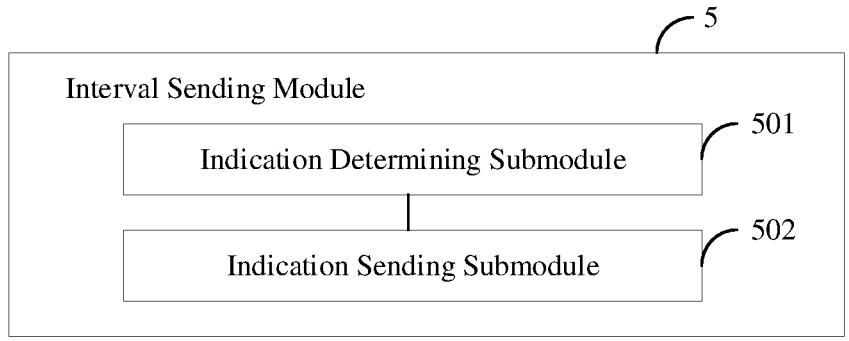
FIG. 23 is a block diagram illustrating an interval sending module according to an example of the present disclosure.

FIG. 23 is a block diagram illustrating an interval sending module according to an example of the present disclosure. As illustrated in FIG. 23, on the basis of the example illustrated in FIG. 22, the interval sending module 5 includes: an indication determining submodule 501 that is configured to determine indication information corresponding to the preset time interval based on a pre-stored first association relationship between preset time intervals and indication information; and an indication sending submodule 502 that is configured to send the indication information to the base station; where the first association relationship is also pre-stored in the base station.

Figure 24:
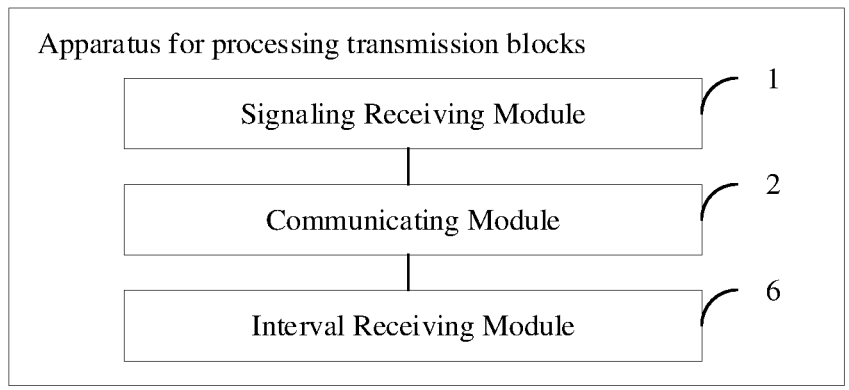
FIG. 24 is a block diagram illustrating an apparatus for processing transmission blocks according to an example of the present disclosure.

FIG. 24 is a block diagram illustrating an apparatus for processing transmission blocks according to an example of the present disclosure. As illustrated in FIG. 24, on the basis of the example illustrated in FIG. 20, the apparatus further includes: an interval receiving module 6 that is configured to receive the preset time interval from the base station before the plurality of transmission blocks are transmitted to the base station or received from the base station.

Figure 25:
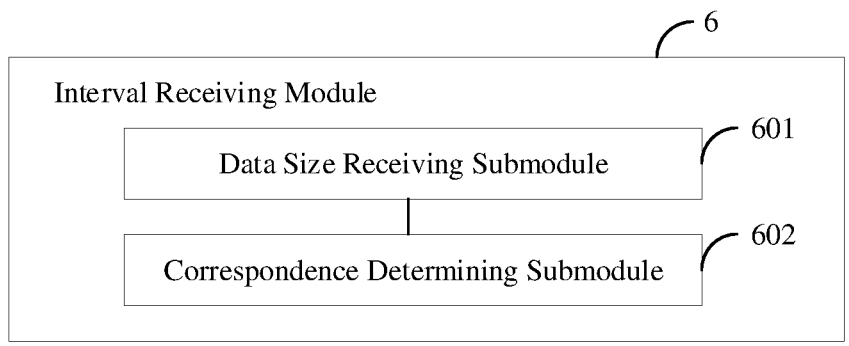
FIG. 25 is a block diagram illustrating an interval receiving module according to an example of the present disclosure.

FIG. 25 is a block diagram illustrating an interval receiving module according to an example of the present disclosure. As illustrated in FIG. 25, on the basis of the example illustrated in FIG. 24, the interval receiving module 6 includes: a data size receiving submodule 601 that is configured to receive a data size of transmission block from the base station; and a correspondence determining submodule 602 that is configured to determine the preset time interval corresponding to the data size based on a pre-stored second association relationship between data sizes and preset time intervals; where the second association relationship is also pre-stored in the base station.

Figure 26:
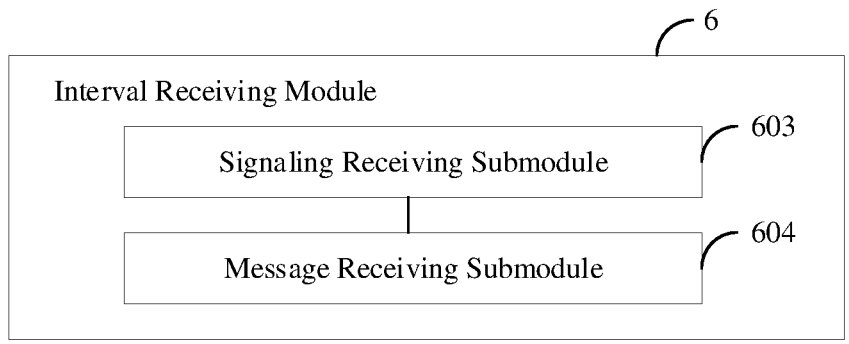
FIG. 26 is a block diagram illustrating an interval receiving module according to an example of the present disclosure.

FIG. 26 is a block diagram illustrating an interval receiving module according to an example of the present disclosure. As illustrated in FIG. 26, on the basis of the example illustrated in FIG. 24, the interval receiving module 6 includes: a signaling receiving submodule 603 that is configured to determine a plurality of time intervals by receiving a radio resource control signaling; and a message receiving submodule 604 that is configured to determine the preset time interval from the plurality of time intervals by receiving a physical downlink control channel message.

Figure 27:
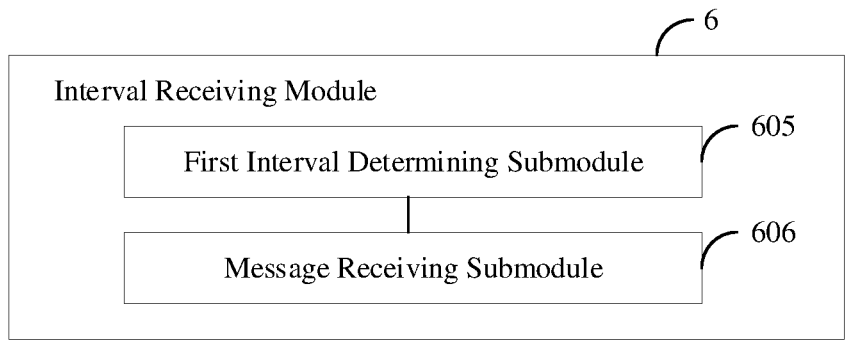
FIG. 27 is a block diagram illustrating an interval receiving module according to an example of the present disclosure.

FIG. 27 is a block diagram illustrating an interval receiving module according to an example of the present disclosure. As illustrated in FIG. 27, on the basis of the example illustrated in FIG. 24, the interval receiving module 6 includes: a first interval determining submodule 605 that is configured to determine a plurality of time intervals based on data processing capability information of the user equipment; and a message receiving submodule 606 that is configured to determine the preset time interval from the plurality of time intervals by receiving a radio resource control signaling or a physical downlink control channel message.

Figure 28:
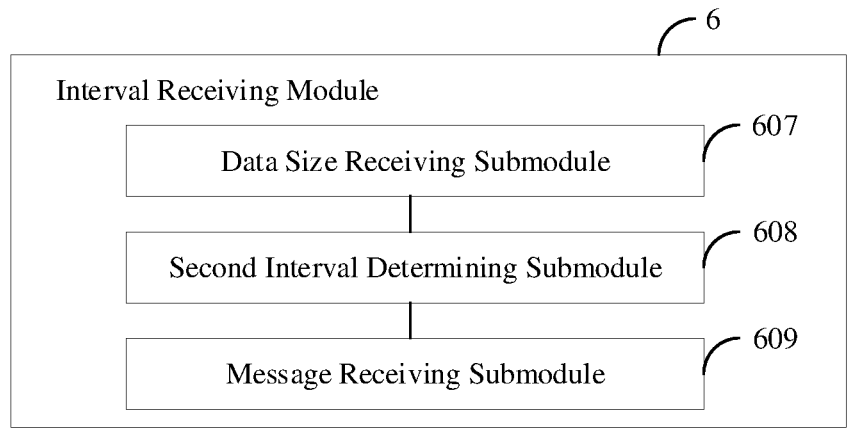
FIG. 28 is a block diagram illustrating an interval receiving module according to an example of the present disclosure.

FIG. 28 is a block diagram illustrating an interval receiving module according to an example of the present disclosure. As illustrated in FIG. 28, on the basis of the example illustrated in FIG. 24, the interval receiving module 6 includes: a data size receiving submodule 607 that is configured to receive a data size of transmission block from the base station; a second interval determining submodule 608 that is configured to determine a plurality of time intervals based on the data size; and a message receiving submodule 609 that is configured to determine the preset time interval from the plurality of time intervals by receiving a radio resource control signaling or a physical downlink control channel message.

Figure 29:
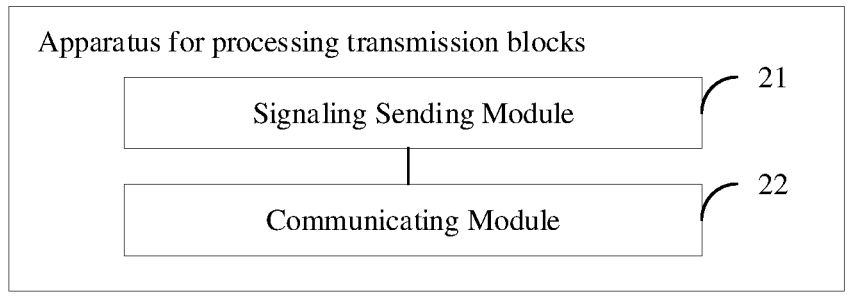
FIG. 29 is a block diagram illustrating an apparatus for processing transmission blocks according to an example of the present disclosure.

FIG. 29 is a block diagram illustrating an apparatus for processing transmission blocks according to an example of the present disclosure. The apparatus for processing transmission blocks illustrated in the example may be applied to a base station. The base station may be a 4G-based base station or a 5G base station. The base station may communicate with the user equipment of the examples illustrated in FIGS. 1-10 and FIGS. 20-28.

As illustrated in FIG. 29, the apparatus for processing transmission blocks includes: a signaling sending module 21 that is configured to send a scheduling signaling to user equipment, where the scheduling signaling is configured to schedule a plurality of transmission blocks; and a communicating module 22 that is configured to transmit the plurality of transmission blocks to the user equipment and/or receive the plurality of transmission blocks from the user equipment, where two adjacent transmission blocks of the plurality of transmission blocks are spaced by a preset time interval.

Figure 30:
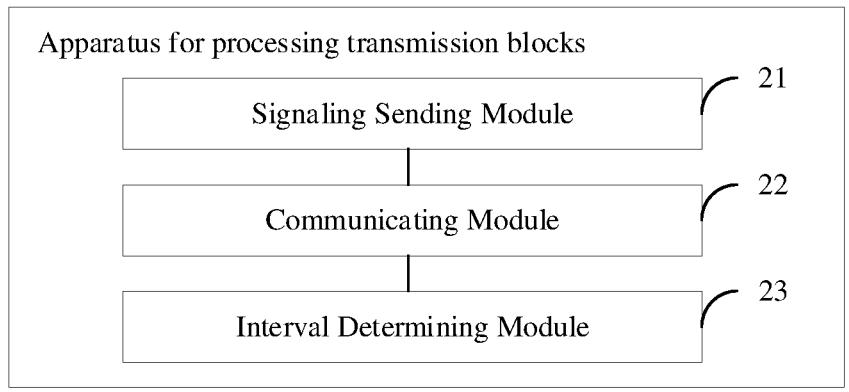
FIG. 30 is a block diagram illustrating an apparatus for processing transmission blocks according to an example of the present disclosure.

FIG. 30 is a block diagram illustrating an apparatus for processing transmission blocks according to an example of the present disclosure. As illustrated in FIG. 30, on the basis of the example illustrated in FIG. 29, the apparatus for processing transmission blocks further includes: an interval determining module 23 that is configured to determine the preset time interval based on a communication protocol with the user equipment before the communicating module transmits the plurality of transmission blocks to the user equipment or receives the plurality of transmission blocks from the user equipment.

Figure 31:
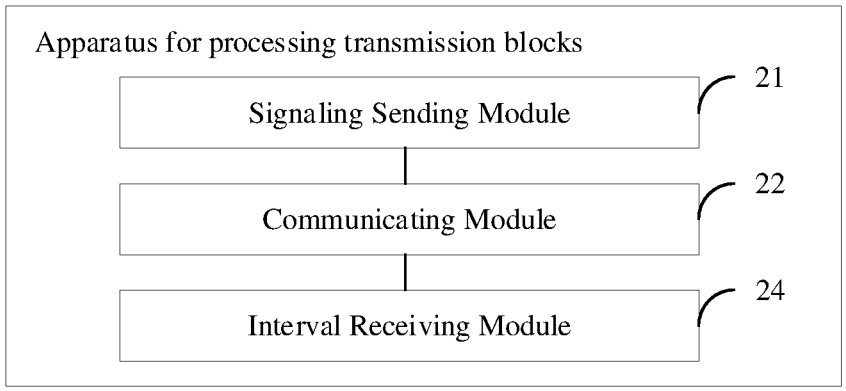
FIG. 31 is a block diagram illustrating an apparatus for processing transmission blocks according to an example of the present disclosure.

FIG. 31 is a block diagram illustrating an apparatus for processing transmission blocks according to an example of the present disclosure. As illustrated in FIG. 31, on the basis of the example illustrated in FIG. 29, the apparatus for processing transmission blocks further includes: an interval receiving module 24 that is configured to receive the preset time interval from the user equipment before the communicating module transmits the plurality of transmission blocks to the user equipment or receives the plurality of transmission blocks from the user equipment.

Figure 32:
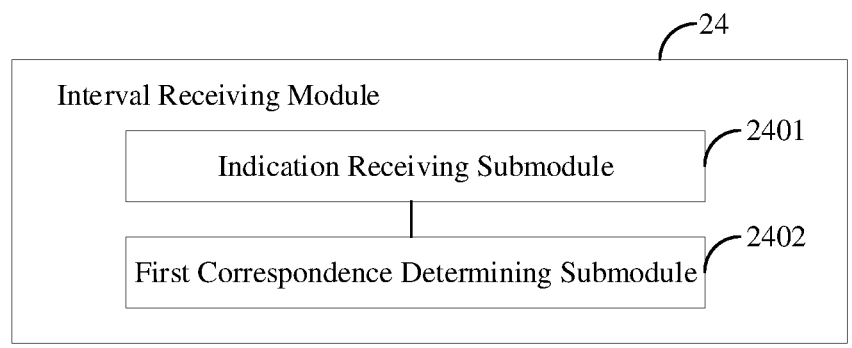
FIG. 32 is a block diagram illustrating an interval sending module according to an example of the present disclosure.

FIG. 32 is a block diagram illustrating an interval receiving module according to an example of the present disclosure. As illustrated in FIG. 32, on the basis of the example illustrated in FIG. 31, the interval receiving module 24 includes: an indication receiving submodule 2401 that is configured to receive indication information corresponding to the preset time interval from the user equipment; and a first correspondence determining submodule 2402 that is configured to determine the preset time interval corresponding to the indication information based on a pre-stored first association relationship between preset time intervals and indication information.

Figure 33:
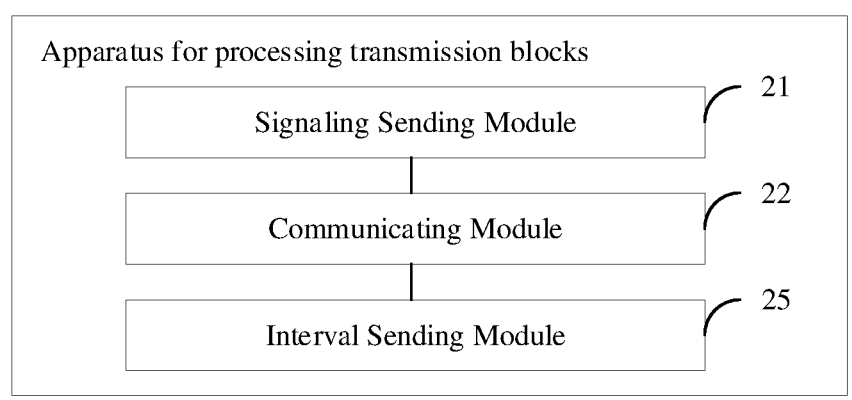
FIG. 33 is a block diagram illustrating an apparatus for processing transmission blocks according to an example of the present disclosure.

FIG. 33 is a block diagram illustrating an apparatus for processing transmission blocks according to an example of the present disclosure. As illustrated in FIG. 33, on the basis of the example illustrated in FIG. 29, the apparatus for processing transmission blocks further includes: an interval sending module 25 that is configured to send the preset time interval to the user equipment before the communicating module transmits the plurality of transmission blocks to the user equipment or receives the plurality of transmission blocks from the user equipment.

Figure 34:
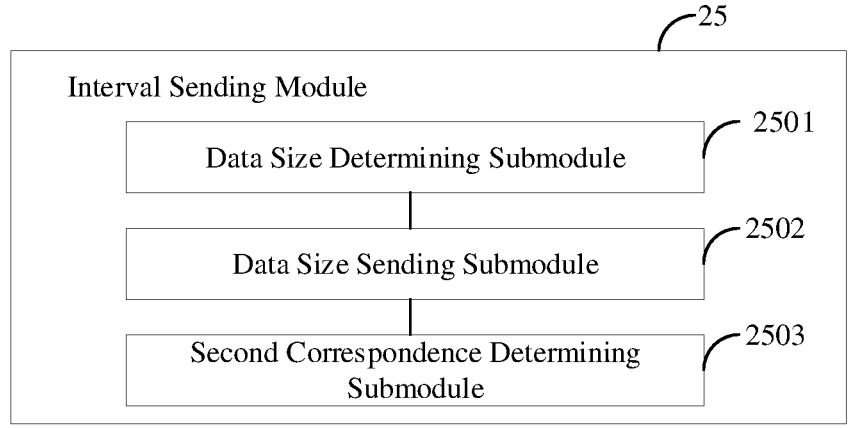
FIG. 34 is a block diagram illustrating an interval sending module according to an example of the present disclosure.

FIG. 34 is a block diagram illustrating an interval sending module according to an example of the present disclosure. As illustrated in FIG. 34, on the basis of the example illustrated in FIG. 33, the interval sending module 25 includes: a data size determining submodule 2501 that is configured to determine a data size of transmission block; a data size sending submodule 2502 that is configured to send the data size to the user equipment; and a second correspondence determining submodule 2503 that is configured to determine the preset time interval corresponding to the data size based on a pre-stored second association relationship between data sizes and preset time intervals; where the second association relationship is also pre-stored in the user equipment.

Figure 35:
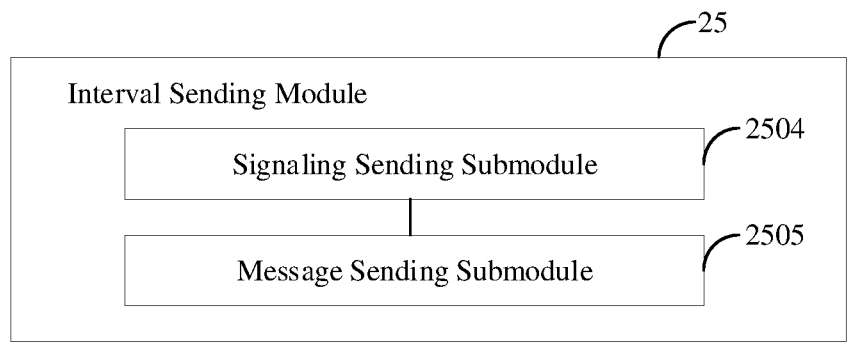
FIG. 35 is a block diagram illustrating an interval sending module according to an example of the present disclosure.

FIG. 35 is a block diagram illustrating an interval sending module according to an example of the present disclosure. As illustrated in FIG. 35, on the basis of the example illustrated in FIG. 33, the interval sending module 25 includes: a signaling sending submodule 2504 that is configured to send a plurality of time intervals to the user equipment through a radio resource control signaling; and a message sending submodule 2505 that is configured to indicate the preset time interval among the plurality of time intervals to the user equipment through a physical downlink control channel message.

Figure 36:
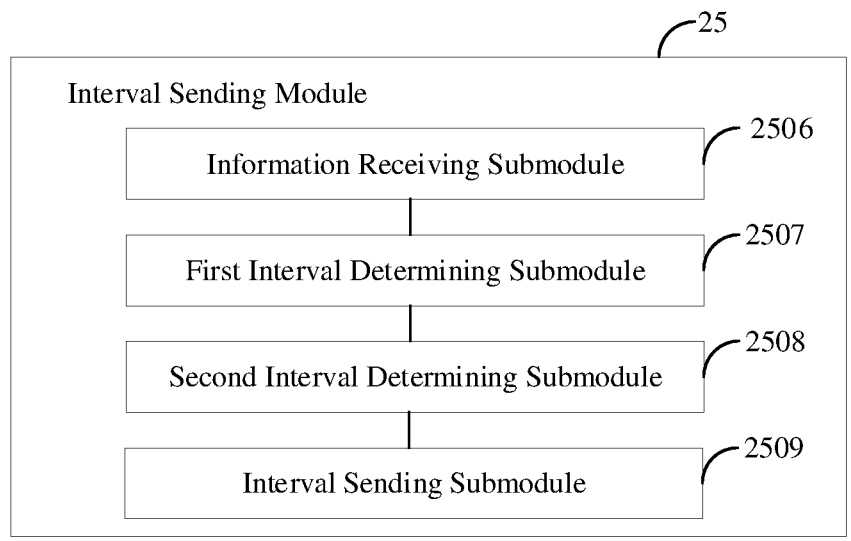
FIG. 36 is a block diagram illustrating an interval sending module according to an example of the present disclosure.

FIG. 36 is a block diagram illustrating an interval sending module according to an example of the present disclosure. As illustrated in FIG. 36, on the basis of the example illustrated in FIG. 33, the interval sending module 25 includes: an information receiving submodule 2506 that is configured to receive data processing capability information from the user equipment; a first interval determining submodule 2507 that is configured to determine a plurality of time intervals based on the data processing capability information; a second interval determining submodule 2508 that is configured to determine the preset time interval from the plurality of time intervals; and an interval sending submodule 2509 that is configured to send the preset time interval to the user equipment through a radio resource control signaling or a physical downlink control channel message.

Figure 37:
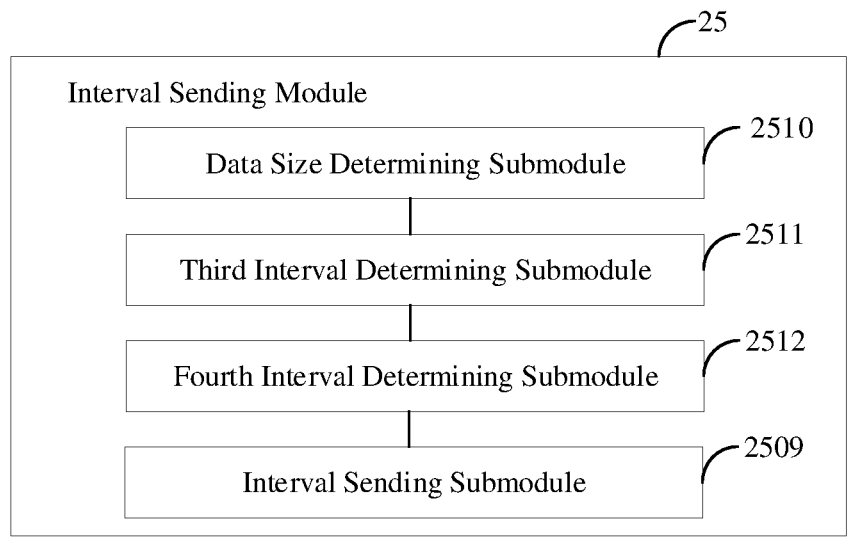
FIG. 37 is a block diagram illustrating an interval sending module according to an example of the present disclosure.

FIG. 37 is a block diagram illustrating an interval sending module according to an example of the present disclosure. As illustrated in FIG. 37, on the basis of the example illustrated in FIG. 33, the interval sending module 25 includes: a data size determining submodule 2510 that is configured to determine a data size of transmission block; a third interval determining submodule 2511 that is configured to determine a plurality of time intervals based on the data size of transmission block; a fourth interval determining submodule 2512 that is configured to determine the preset time interval from the plurality of time intervals; and an interval sending submodule 2509 that is configured to send the preset time interval to the user equipment through a radio resource control signaling or a physical downlink control channel message.

Regarding the apparatus in the foregoing examples, the specific manner in which each module performs its operation has been described in detail in the examples of the corresponding method, and will not be repeated here.

Since the apparatus examples essentially correspond to the method examples, reference may be made to the description of related parts of the method examples. The apparatus examples described above are merely illustrative, where the modules described as separate members may be or not be physically separated, and the members displayed as modules may be located in one place, or may be distributed to a plurality of networks. Some or all of the modules may be selected according to actual needs.

Figure 38:
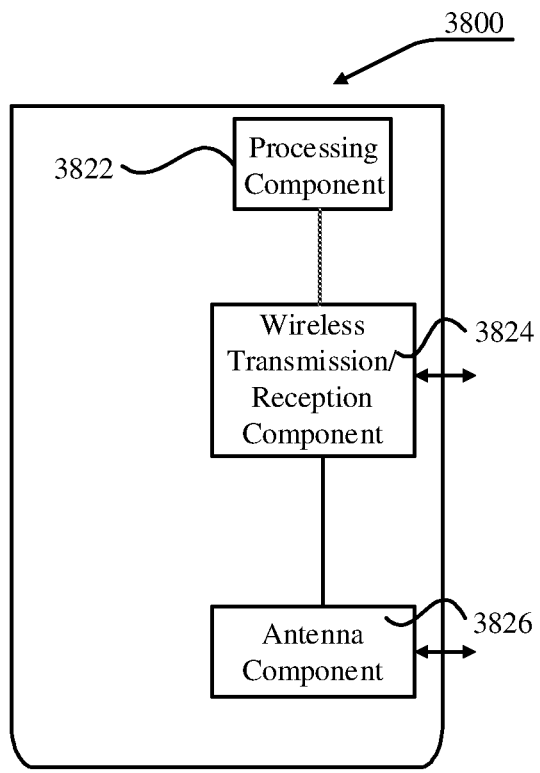
FIG. 38 is a schematic diagram illustrating a device for processing transmission blocks according to an example of the present disclosure.

FIG. 38 is a schematic diagram illustrating a device for processing transmission blocks according to an example of the present disclosure. The device 3800 may be provided as a base station. As illustrated in FIG. 38, the device 3800 includes a processing component 3822, a wireless transmission/reception component 3824, an antenna component 3826, and a signal processing part peculiar to the wireless interface. The processing component 3822 may further include one or more processors. One of the processors in the processing component 3822 may be configured to perform the method of processing transmission blocks described by any one of the foregoing examples illustrated in FIGS. 11-19.

Figure 39:
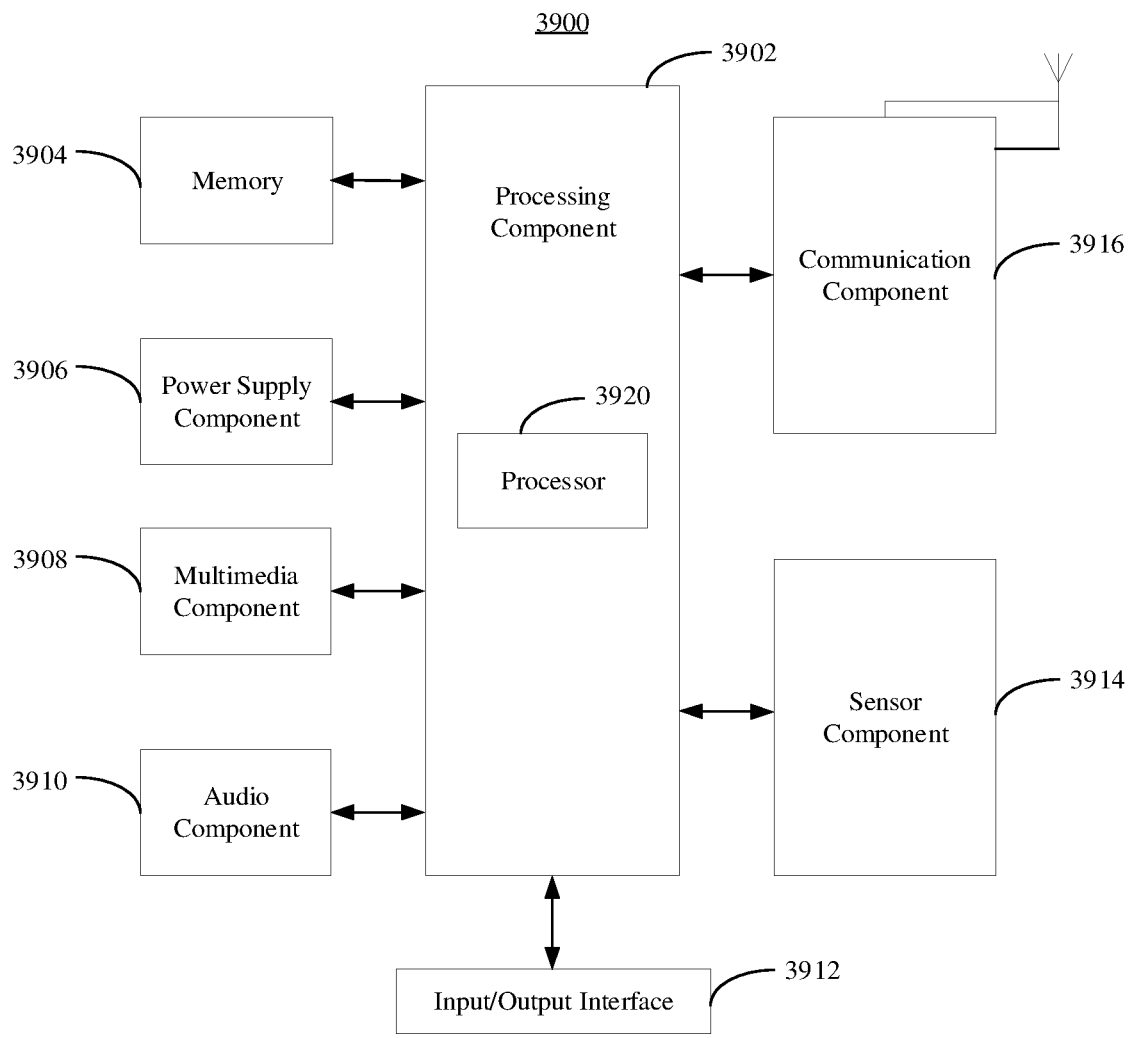
FIG. 39 is a schematic diagram illustrating a device for processing transmission blocks according to an example of the present disclosure.

FIG. 39 is a schematic diagram illustrating a device 3900 for processing transmission blocks according to an example of the present disclosure. For example, the device 3900 may be user equipment such as a mobile phone, a computer, a digital broadcasting terminal, a messaging device, a game console, a tablet device, a medical device, a fitness device, a personal digital assistant, and the like.

As illustrated in FIG. 39, the device 3900 may include one or more of the following components: a processing component 3902, a memory 3904, a power supply component 3906, a multimedia component 3908, an audio component 3910, an input/output (I/O) interface 3912, a sensor component 3914, and a communication component 3916.

The processing component 3902 generally controls the overall operations of the device 3900, such as operations associated with display, phone calls, data communications, camera operations, and recording operations. The processing element 3902 may include one or more processors 3920 to execute instructions to complete all or part of the steps of the above method illustrated in FIGS. 1-10. In addition, the processing component 3902 may include one or more modules which facilitate the interaction between the processing component 3902 and other components. For example, the processing component 3902 may include a multimedia module to facilitate the interaction between the multimedia component 3908 and the processing component 3902.

The memory 3904 is configured to store various types of data to support the operation of the device 3900. Examples of such data include instructions for any application or method operated on the device 3900, contact data, phonebook data, messages, pictures, videos, and the like. The memory 3904 may be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

The power supply component 3906 provides power to different components of the device 3900. The power supply component 3906 may include a power management system, one or more power supplies, and other components associated with generating, managing, and distributing power for the device 3900.

The multimedia component 3908 includes a screen providing an output interface between the device 3900 and a user. In some embodiments, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 3908 includes a front camera and/or a rear camera. The front camera and/or rear camera may receive external multimedia data when the device 3900 is in an operating mode, such as a photographing mode or a video mode. Each front camera and rear camera may be a fixed optical lens system or have focal length and optical zooming capability.

The audio component 3910 is configured to output and/or input an audio signal. For example, the audio component 3910 includes a microphone (MIC) that is configured to receive an external audio signal when the device 3900 is in an operating mode, such as a call mode, a recording mode, and a voice recognition mode. The received audio signal may be further stored in the memory 3904 or sent via the communication component 3916. In some embodiments, the audio component 3910 also includes a speaker for outputting an audio signal.

The I/O interface 3912 provides an interface between the processing component 3902 and a peripheral interface module. The above peripheral interface module may be a keyboard, a click wheel, buttons, or the like. These buttons may include but not limited to, a home button, a volume button, a start button and a lock button.

The sensor component 3914 includes one or more sensors to provide the device 3900 with status assessments in various aspects. For example, the sensor component 3914 may detect an open/closed state of the device 3900 and a relative positioning of components such as the display and keypad of the device 3900, and the sensor component 3914 may also detect a change in position of the device 3900 or a component of the device 3900, the presence or absence of user contact with the device 3900, orientation or acceleration/deceleration of the device 3900, and temperature change of the device 3900. The sensor component 3914 may include a proximity sensor configured to detect the presence of a nearby object without any physical contact. The sensor component 3914 may further include an optical sensor, such as a Complementary Metal-Oxide-Semiconductor (CMOS) or Charged Coupled Device (CCD) image sensor which is used in imaging applications. In some embodiments, the sensor component 3914 may also include an acceleration sensor, a gyro sensor, a magnetic sensor, a pressure sensor, or a temperature sensor.

The communication component 3916 is configured to facilitate wired or wireless communication between the device 3900 and other devices. The device 3900 may access a wireless network based on a communication standard, such as WiFi, 4G or 5G, or a combination thereof. In an exemplary embodiment, the communication component 3916 receives broadcast signals or broadcast related information from an external broadcast management system via a broadcast channel. In an exemplary embodiment, the communication component 3916 also includes a near field communication (NFC) module to facilitate short-range communication. In an exemplary embodiment, the communication component 3916 may be implemented based on a radio frequency identification (RFID) technology, an infrared data association (IrDA) technology, an ultra-wideband (UWB) technology, a Bluetooth® (BT) technology and other technologies.

In some exemplary embodiments, the device 3900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method of processing transmission blocks described in any of the above examples.

In some exemplary embodiments, there is also provided a non-transitory computer-readable storage medium including instructions, such as the memory 3904 including instructions executable by the processor 3920 of the device 3900 to implement the above methods illustrated in FIGS. 1-10. For example, the non-transitory computer-readable storage medium may be a Read-Only Memory (ROM), a Random Access Memory (RAM), a CD-ROM, a magnetic tape, a floppy disk, an optical data storage device, and the like.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

Other implementations of the present disclosure will be apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

The invention claimed is:

1. A method of processing transmission blocks, comprising:
    receiving, by user equipment, a scheduling signaling from a base station, wherein the scheduling signaling is configured to schedule a plurality of transmission blocks having a same size; and
    performing, by the user equipment, a transmission on the plurality of transmission blocks with the base station,
    wherein every two adjacent transmission blocks of the plurality of transmission blocks are spaced by a preset time interval having a same length;
    the preset time interval is determined from a plurality of candidate time intervals based on a signaling sent by the base station; and
    the transmission is one of an uplink transmission or a downlink transmission.

2. The method according to claim 1, further comprising:
    before performing the transmission on the plurality of transmission blocks with the base station, determining, by the user equipment, the preset time interval based on a communication protocol with the base station.

3. The method according to claim 1, further comprising:
    before performing the transmission on the plurality of transmission blocks with the base station, determining, by the user equipment, the preset time interval based on data processing capability information of the user equipment; and
    sending, by the user equipment, the preset time interval to the base station.

4. The method according to claim 3, wherein sending the preset time interval to the base station comprises:
    determining, by the user equipment, indication information corresponding to the preset time interval based on a pre-stored association relationship between preset time intervals and indication information; and
    sending, by the user equipment, the indication information to the base station;
    wherein the association relationship is pre-stored in the user equipment and the base station.

5. The method according to claim 1, further comprising:
    before performing the transmission on the plurality of transmission blocks with the base station, determining, by the user equipment, the preset time interval from the plurality of candidate time intervals based on the signaling sent by the base station.

6. The method according to claim 5, wherein determining the preset time interval from the plurality of candidate time intervals based on the signaling sent by the base station comprises:
    receiving, by the user equipment, a data size of transmission block from the base station; and
    determining, by the user equipment, the preset time interval corresponding to the data size based on a pre-stored association relationship between data sizes and preset the plurality of candidate time intervals;
    wherein the association relationship is pre-stored in the user equipment and the base station.

7. The method according to claim 5, wherein determining the preset time interval from the plurality of candidate time intervals based on the signaling sent by the base station comprises:
    determining, by the user equipment, the plurality of candidate time intervals by receiving a radio resource control signaling; and
    determining, by the user equipment, the preset time interval from the plurality of candidate time intervals by receiving a physical downlink control channel message.

8. The method according to claim 5, wherein determining the preset time interval from the plurality of candidate time intervals based on the signaling sent by the base station comprises:
- determining, by the user equipment, the plurality of candidate time intervals based on data processing capability information of the user equipment; and
- determining, by the user equipment, the preset time interval from the plurality of candidate time intervals by receiving a radio resource control signaling or a physical downlink control channel message.

9. The method according to claim 5, wherein determining the preset time interval from the plurality of candidate time intervals based on the signaling sent by the base station comprises:
- receiving, by the user equipment, a data size of transmission block from the base station;
- determining, by the user equipment, the plurality of candidate time intervals based on the data size; and
- determining, by the user equipment, the preset time interval from the plurality of candidate time intervals by receiving a radio resource control signaling or a physical downlink control channel message.

10. The method according to claim 1, wherein the user equipment is a Narrow Band Internet of Things (NB-IoT) type device, or a Machine Type Communication (MTC) type device.

11. The method according to claim 1, further comprising:
- sending, by the base station, the scheduling signaling to the user equipment; and
- performing, by the base station, the transmission on the plurality of transmission blocks with the user equipment.

12. The method according to claim 11, further comprising:
- before performing the transmission on the plurality of transmission blocks with the user equipment, determining, by the base station, the preset time interval based on a communication protocol with the user equipment.

13. The method according to claim 11, further comprising:
- before performing the transmission on the plurality of transmission blocks with the user equipment, receiving, by the base station, the preset time interval from the user equipment.

14. The method according to claim 11, further comprising:
- before performing the transmission on the plurality of transmission blocks with the user equipment, sending, by the base station, the signaling to the user equipment.

15. The method according to claim 14, wherein sending the signaling to the user equipment comprises:
- determining, by the base station, a data size of transmission block;
- sending, by the base station, the data size to the user equipment; and
- determining, by the base station, the preset time interval corresponding to the data size based on a pre-stored association relationship between data sizes and the plurality of candidate time intervals;
- wherein the association relationship is pre-stored in the user equipment and the base station.

16. The method according to claim 14, wherein sending the signaling to the user equipment comprises:
- sending, by the base station, the plurality of candidate time intervals to the user equipment through a radio resource control signaling; and
- indicating, by the base station, the preset time interval among the plurality of candidate time intervals to the user equipment through a physical downlink control channel message.

17. The method according to claim 14, wherein sending the signaling to the user equipment comprises:
- receiving, by the base station, data processing capability information from the user equipment;
- determining, by the base station, the plurality of candidate time intervals based on the data processing capability information;
- determining, by the base station, the preset time interval from the plurality of candidate time intervals; and
- sending, by the base station, the preset time interval to the user equipment through a radio resource control signaling or a physical downlink control channel message.

18. The method according to claim 14, wherein sending the signaling to the user equipment comprises:
- determining, by the base station, a data size of transmission block;
- determining, by the base station, the plurality of candidate time intervals based on the data size of transmission block;
- determining, by the base station, the preset time interval from the plurality of candidate time intervals; and
- sending, by the base station, the preset time interval to the user equipment through a radio resource control signaling or a physical downlink control channel message.

19. The method according to claim 1, further comprising:
- no transmission is performed during the preset time interval.

20. The method according to claim 1, wherein the preset time interval is configured to demodulate a previous transmission block.

* * * * *